(12) United States Patent
Shibata

(10) Patent No.: US 9,960,936 B2
(45) Date of Patent: May 1, 2018

(54) TRANSMISSION APPARATUS

(71) Applicant: FUJITSU LIMITED, Kawasaki-shi, Kanagawa (JP)

(72) Inventor: Manabu Shibata, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/481,875

(22) Filed: Apr. 7, 2017

(65) Prior Publication Data

US 2017/0346663 A1 Nov. 30, 2017

(30) Foreign Application Priority Data

May 31, 2016 (JP) ................................. 2016-108711

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .............................. *H04L 25/03057* (2013.01)

(58) Field of Classification Search
CPC .................... H04L 25/03057; H04L 25/03885
See application file for complete search history.

(56) References Cited

U.S. PATENT DOCUMENTS

| 6,304,188 | B1* | 10/2001 | Subak ............... H01R 13/6666 340/635 |
| 7,275,962 | B1 | 10/2007 | Yamakami et al. |
| 9,696,361 | B1* | 7/2017 | Sun ..................... G01R 31/021 |
| 2004/0127091 | A1 | 7/2004 | Naito et al. |
| 2012/0328114 | A1* | 12/2012 | Takeuchi ............... H03G 9/005 381/57 |

FOREIGN PATENT DOCUMENTS

| JP | 2004-213949 | 7/2004 |
| JP | 2008-16342 | 1/2008 |
| JP | 2011-258471 | 12/2011 |

\* cited by examiner

*Primary Examiner* — Shuwang Liu
*Assistant Examiner* — Gina McKie
(74) *Attorney, Agent, or Firm* — Fujitsu Patent Center

(57) ABSTRACT

A transmission apparatus includes a connector that couples a signal path to a receiver, an equalizer that performs an equalization operation on received signals to be input to the receiver via the connector, a controller that calculates a coefficient controlling an operation of the equalizer and sets the coefficient in the equalizer, and a detector that detects a mating fault of the signal path in the connector in response to the coefficient configured by the controller.

6 Claims, 21 Drawing Sheets

| NAME OF RECEIVED SIGNAL | TARGET PORT | DIFFERENTIAL SIGNAL POLARITY | CONNECTOR NO. | PIN LOCATION | REMARKS |
|---|---|---|---|---|---|
| Lane1-1_P | 1 | Positive channel | CN1 | C28 | PIN AT COLUMN C AND ROW 28 |
| Lane1-1_N | 1 | Negative channel | CN1 | B29 | PIN AT COLUMN B AND ROW 29 |
| Lane1-2_P | 1 | Positive channel | CN1 | C32 | PIN AT COLUMN C AND ROW 32 |
| Lane1-2_N | 1 | Negative channel | CN1 | B32 | PIN AT COLUMN B AND ROW 32 |
| Lane1-3_P | 1 | Positive channel | CN1 | E12 | PIN AT COLUMN E AND ROW 12 |
| Lane1-3_N | 1 | Negative channel | CN1 | F12 | PIN AT COLUMN F AND ROW 12 |
| Lane1-4_P | 1 | Positive channel | CN2 | C08 | PIN AT COLUMN C AND ROW 08 |
| Lane1-4_N | 1 | Negative channel | CN2 | B08 | PIN AT COLUMN B AND ROW 08 |
| Lane2-1_P | 2 | Positive channel | CN3 | C32 | PIN AT COLUMN C AND ROW 32 |
| Lane2-1_N | 2 | Negative channel | CN3 | B32 | PIN AT COLUMN B AND ROW 32 |
| Lane2-2_P | 2 | Positive channel | CN2 | E17 | PIN AT COLUMN E AND ROW 17 |
| Lane2-2_N | 2 | Negative channel | CN2 | F16 | PIN AT COLUMN F AND ROW 16 |
| ⋮ | ⋮ | | | | |
| ⋮ | ⋮ | | | | |
| ⋮ | ⋮ | | | | |
| Lane18-3_P | 18 | Positive channel | CN2 | C11 | PIN AT COLUMN C AND ROW 11 |
| Lane18-3_N | 18 | Negative channel | CN2 | B11 | PIN AT COLUMN B AND ROW 11 |
| Lane18-4_P | 18 | Positive channel | CN3 | C23 | PIN AT COLUMN C AND ROW 23 |
| Lane18-4_N | 18 | Negative channel | CN3 | B24 | PIN AT COLUMN B AND ROW 24 |

FIG. 15

| CONNECTOR NO. | PIN LOCATION COLUMN | PIN LOCATION ROW | DETERMINATION AREA | REMARKS |
|---|---|---|---|---|
| CN1 | - | 1 | 1 | SAME AREA FROM COLUMN A TO COLUMN G |
| CN1 | - | 2 | 1 | ROW ONLY IS REFERENCED FOR AREA DETERMINATION |
| CN1 | - | 3 | 1 | |
| CN1 | - | 4 | 1 | |
| CN1 | - | 5 | 1 | |
| CN1 | - | 6 | 1 | |
| CN1 | - | 7 | 1 | |
| CN1 | - | 8 | 1 | |
| CN1 | - | 9 | 1 | |
| CN1 | - | 10 | 1 | |
| CN1 | - | 11 | 2 | |
| CN1 | - | 12 | 2 | |
| ⋮ | ⋮ | ⋮ | ⋮ | |
| ⋮ | ⋮ | ⋮ | ⋮ | |
| CN1 | - | 38 | 3 | |
| CN1 | - | 39 | 3 | |
| CN1 | - | 40 | 3 | |
| CN2 | - | 1 | 4 | |
| CN2 | - | 2 | 4 | |
| CN2 | - | 3 | 4 | |
| CN2 | - | 4 | 4 | |
| CN2 | - | 5 | 4 | |
| ⋮ | ⋮ | ⋮ | ⋮ | |
| ⋮ | ⋮ | ⋮ | ⋮ | |
| CN4 | - | 39 | 16 | |
| CN4 | - | 40 | 16 | |

TRANSMISSION APPARATUS

CROSS-REFERENCE TO RELATED APPLICATION

This application is based upon and claims the benefit of priority of the prior Japanese Patent Application No. 2016-108711, filed on May 31, 2016, the entire contents of which are incorporated herein by reference.

FIELD

The embodiment discussed herein is related to a transmission apparatus.

BACKGROUND

Transmission apparatuses of related art achieve high-speed transmission by connecting multiple printed circuit boards with cables and connectors, and by allowing tens of electrical signals or more to flow through the connectors. Since such transmission apparatuses may suffer from a signal quality drop because of an impedance mismatch between the connector and the printed circuit board, a transmission apparatus on a receiver side performs a compensation operation using an equalizer or through an equalization process. However, if a connector suffers from a physical mating fault, the compensation operation is difficult. The physical mating fault advances in condition with time in response to a mating strength or a mating reaction of the connectors, and becomes even more serious.

A technique available as a mating fault detection technique in related art is related to a connector having pins different in length and uses the pin length difference. According to one of such techniques, longer pins in the connector are mainly used to transmit signals, and shorter pins in the connector are also used to be mated. If the shorter pins are in a contact condition, the longer pins are determined to be sufficiently plugged. However, this method involves a higher degree of precision in a connector mechanism. Furthermore, the mating is determined to be normal if the contact of the shorter pins is achieved. Even if the connector is not in a fully plugged state, the mating fault may be possibly undetected.

A connector used in a high-speed signal path may achieve predetermined impedance characteristics in the fully plugged state thereof. In an incompletely plugged state, the connector suffers from an impedance mismatch in a high-frequency region though no problem is created in a direct current (DC) or a low-frequency region. Such an impedance mismatch becomes a factor of attenuation in a local frequency and then in an entire transmission frequency band, thereby degrading a signal. The signal degradation becomes particularly pronounced in a high frequency region where the effect of a dielectric loss exceeds the skin effect or when a further high-speed design is introduced. A technique is desired to easily and reliably detect the incompletely plugged state, such as loose mating, which is difficult to detect by verifying the presence or absence of contact alone.

The followings are reference documents.
[Document 1] Japanese Laid-open Patent Publication No. 2004-213949,
[Document 2] Japanese Laid-open Patent Publication No. 2008-16342, and
[Document 3] Japanese Laid-open Patent Publication No. 2011-258471.

SUMMARY

According to an aspect of the invention, a transmission apparatus includes: a connector that couples a signal path to a receiver; an equalizer that performs an equalization operation on received signals to be input to the receiver via the connector; a controller that calculates a coefficient controlling an operation of the equalizer and sets the coefficient in the equalizer; and a detector that detects a mating fault of the signal path in the connector in response to the coefficient configured by the controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 illustrates an example of signal path to physical location correspondence information of the second modification;

FIG. 15 illustrates an example of physical location to segmented area correspondence information of the second modification;

DESCRIPTION OF EMBODIMENT

A transmission apparatus of an embodiment of the disclosure is described in detail with reference to the drawings. The disclosure is not limited to the transmission apparatus of the embodiment.

Figure 1:
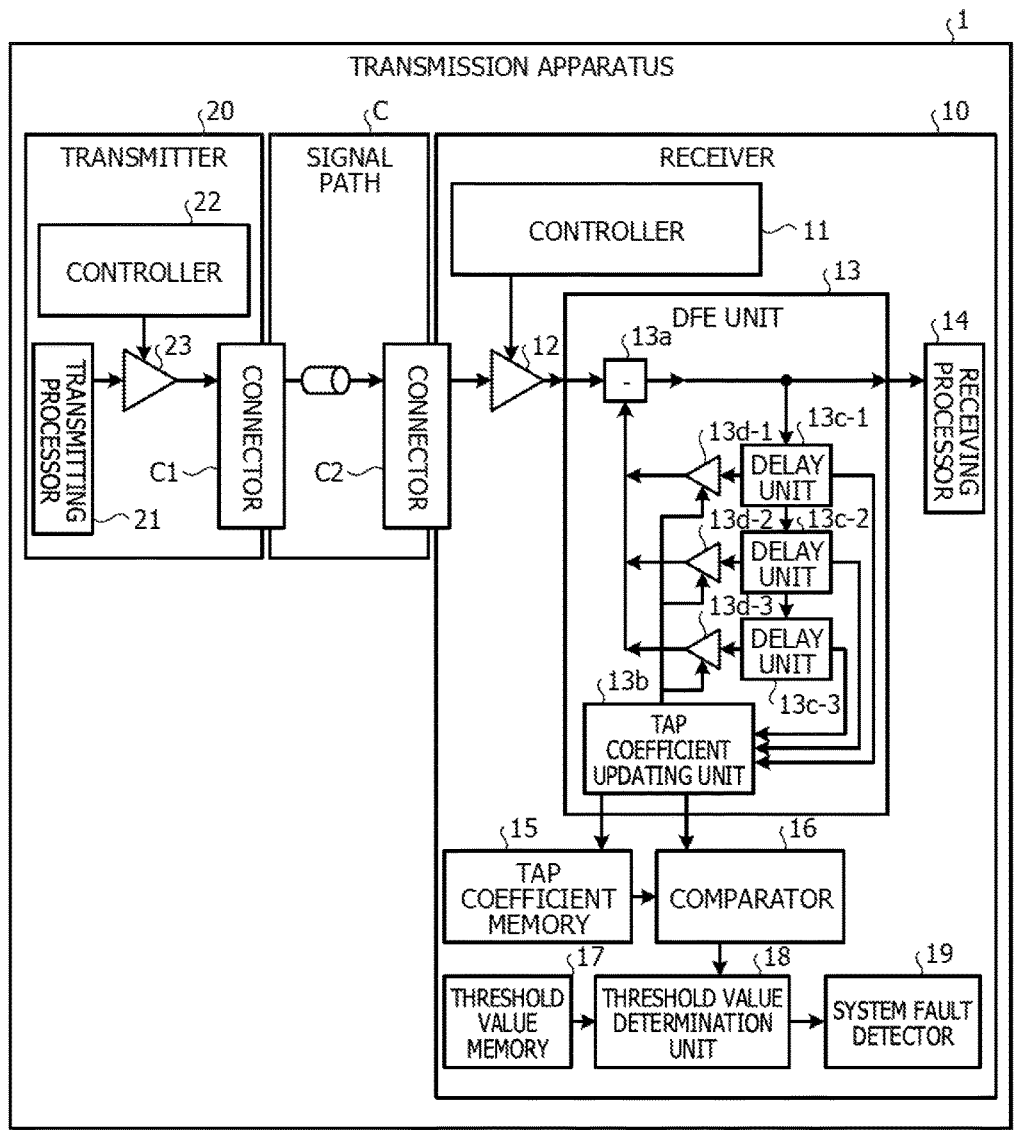
FIG. 1 illustrates a configuration of a transmission apparatus of an embodiment.

FIG. 1 illustrates a configuration of a transmission apparatus 1 of the embodiment. Referring to FIG. 1, the transmission apparatus 1 includes a receiver 10, a transmitter 20, and a signal path C. The receiver 10 includes a controller 11, an amplifier 12, a decision feedback equalizer (DFE) unit 13, a receiving processor 14, a tap coefficient memory 15, a comparator 16, a threshold value memory 17, a threshold value determination unit 18, and a system fault detector 19. Each of these configuration elements is connected such that data or signals are input and/or output. The transmitter 20 includes a transmitting processor 21, a controller 22, and an amplifier 23. The signal path C includes connectors C1 and C2.

The transmission apparatus 1 exchanges signals between separate boards (the receiver 10 and the transmitter 20) via the two connectors C1 and C2 in the signal path C, such as a back board. The transmitter 20 is a transmitting block that transmits a high-speed signal via a serializer and deserializer (SerDes), and includes the transmitting processor 21 that performs signal processing, such as coding, and processes an analog signal as a transmission signal. The transmitter 20 also includes the controller 22 that performs amplitude control for waveshape compensation and pre-emphasis control during transmission, and the amplifier 23 serving as an analog processor that performs signal compensation under the control of the controller 22.

The signal path C transmits a signal to the receiver 10 via the connector C1 from the transmitter 20, a signal path on the back board, and the connector C2 on the receiver side. In the receiver 10, the received signal passes through a block that performs compensation on the analog signal, and reaches the receiving processor 14 that performs decoding. The receiver 10 includes the controller 11 that serves as a function block to perform compensation on the analog signal. The controller 11 performs gain control for amplitude compensation of the received signal, and offset compensation and equalizer control. The amplifier 12 amplifies the analog signal. Each of the controller 11 and the amplifier 12 includes a mechanism that is compensated for by a fixed value.

The receiver 10 includes the DFE unit 13 as another analog waveshape compensation mechanism. The DFE unit 13 includes a tap coefficient updating unit 13b. The tap coefficient updating unit 13b controls each tap of a digital filter that controls characteristics of an infinite impulse response (IIR) filter such that compensation performance is determined when compensation characteristics are varied in response to an input signal. The digital filter may be the IIR filter, a finite impulse response (FIR) filter, or a combination thereof. Depending on a desired equalization capability, one of the filters having a variety of shapes may be used. In accordance with the embodiment, the IIR filter having the simplest form is described for exemplary purposes.

If the IIR filter is used, the DFE unit 13 includes delay units 13c-1, 13c-2, and 13c-3, and delays an input signal by a symbol unit time. The tap coefficient updating unit 13b calculates the tap coefficient to cause multipliers 13d-1, 13d-2, and 13d-3 to remove inter-symbol interference in response to each tap coefficient. In response to each delay phase, the DFE unit 13 cancels the inter-symbol interference as one symbol, two symbols, three symbols, . . . , thereby performing the signal compensation.

The comparator 16 compares the calculated tap coefficient with a value stored on the tap coefficient memory 15 and starting with a tap coefficient at an initial state as a basic value. The threshold value determination unit 18 compares the comparison result with a value stored on the threshold value memory 17 for an abnormal value determination (acceptability standard permissible value), thereby determining that the connector C2 has transitioned to a faulty state. Upon detecting the faulty state, the system fault detector 19 notifies the system side of the faulty state. The determination is performed on each of the multiple taps used in the DFE unit 13.

The DFE unit 13 of FIG. 1 indicates a typical logic structure by indicating a multiplication (weight) coefficient imparted to each tap, and is not illustrated to intend to limit the number of and structure of taps. For example, in accordance with the embodiment, the DFE unit 13 has three taps only, and an IIR filter structure. The DFE unit 13 may employ one of various equalization systems. The multiplication (weight) coefficients imparted to the three taps are used to perform an equalization operation together with the linear equalizer such that frequency characteristics of the signal path C are set to be flat.

Figure 2:
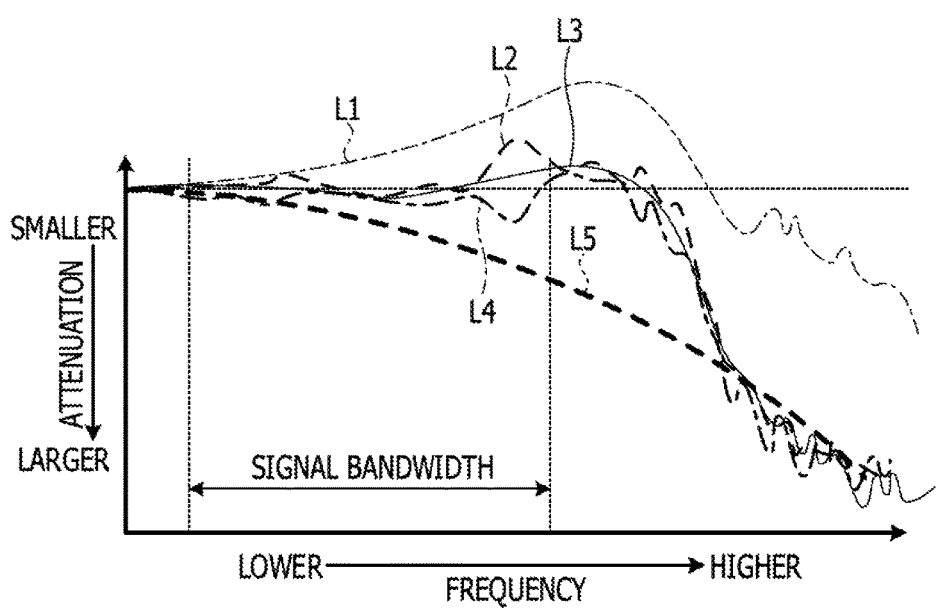
FIG. 2 illustrates equalization characteristics including compensation of a linear equalizer.

FIG. 2 illustrates equalization characteristics including compensation of the linear equalizer. Referring to FIG. 2, the abscissa represents frequency, while the ordinate represents attenuation. As illustrated in FIG. 2, curve L1 represents compensation characteristics of the linear equalizer. Curve L2 represents an amount of compensation of an equalization mechanism (the DFE unit 13) when no mating fault occurs in the connector C2. Curve L3 represents theoretical attenuation characteristics along the length of wiring (attenuation characteristics with respect to frequency). Curve L4 represents compensation results of the linear equalizer (compensation characteristics with respect to the theoretical attenuation characteristic standard). Curve L5 represents theoretical attenuation characteristics with respect to the wiring length (attenuation to frequency characteristics).

The linear equalizer results in gain in a high-frequency region in a transmission bandwidth by compensating for quadratic curve attenuation having a slope in agreement with the wiring length, and thus has a function of controlling an amount of attenuation by cancelling attenuation. In addition to this function, the DFE unit 13 has an equalization function. The equalization function alone is able to provide gain to an attenuated signal. In accordance with the embodiment, however, the DFE unit 13 performs compensation for attenuation in a narrow frequency band after the linear equalizer has performed compensation to a certain degree. Curve L4 represents the frequency characteristics that have been compensated for by the linear equalizer, and suffers from attenuation on a particular frequency caused by a degradation factor, such as a stub, in the signal path C. The DFE unit 13 compensates for attenuation using the equalization function, and has a function of raising gain on the particular frequency to achieve ideal transmission characteristics that are flat in the transmission frequency bandwidth.

The DFE unit 13 includes multiple delay units 13c-1, 13c-2, and 13c-3, and multipliers 13d-1, 13d-2, and 13d-3, each having an amplification function called tap. The amplification function may be theoretically implemented by an analog or digital configuration. The tap coefficient is used to determine the gain of the amplification function. The tap coefficient is calculated using a feedback loop such that the transmission characteristics are flat. Depending on the system, the DFE unit 13 may perform training as an initialization process, and determine the tap coefficient in accordance with the characteristics at this point of time. In accordance with the embodiment, training is performed again after the determination of the tap coefficient, and thus re-configuration is performed.

Figure 3:
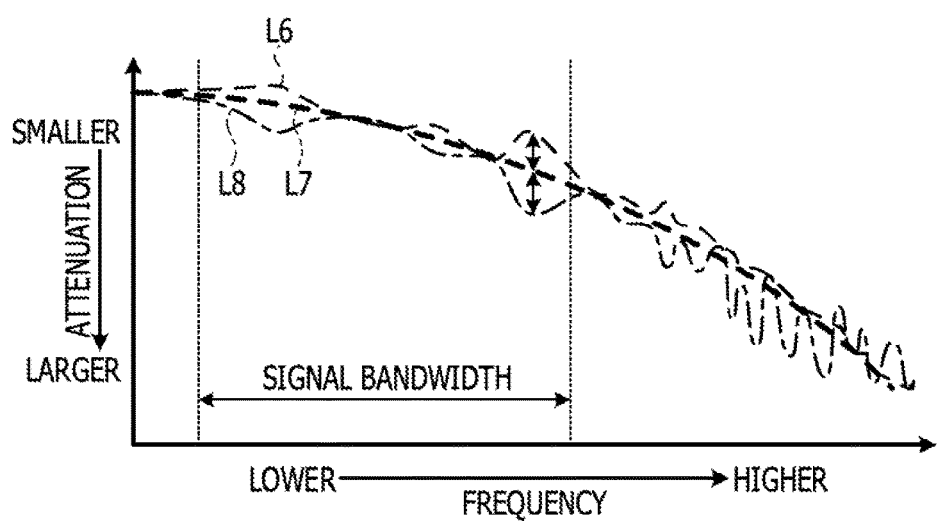
FIG. 3 illustrates signal path frequency characteristics and equalization characteristics of a decision feedback equalizer (DFE)

FIG. 3 illustrates signal path frequency characteristics and equalization characteristics of DFE. In FIG. 3, the abscissa represents frequency while the ordinate represents attenuation. Referring to FIG. 3, curve L6 represents an amount of compensation with the connector C2 free from any mating fault. Using the amount of compensation, the DFE unit 13 performs the equalization operation to converge the amount of attenuation to a theoretical attenuation value on condition that the attenuation compensation of the linear equalizer is accounted for. Curve L7 represents theoretical attenuation characteristics along the wiring length (attenuation to frequency characteristics). Curve L8 represents attenuation to frequency characteristics with the connector C2 free from any mating fault.

FIG. 3 illustrates the signal path frequency characteristics and the equalization characteristics such that only the function of the equalization operation is comparable with that of FIG. 2. Curve L7 represents theoretical attenuation characteristics, according to which gain that is to be equalized is calculated. Although FIG. 3 illustrates a theoretical attenuation characteristic standard, the transmission characteristics are normally controlled to be flat within the transmission bandwidth, and an amount of attenuation along the wiring length is compensated for. FIG. 3 illustrates an amount of attenuation with respect to the theoretical characteristics, on the premise that the attenuation along the wiring length is compensated for by the linear equalizer.

If the wiring is free from stub and impedance mismatch, the amount of attenuation increases in accordance with a quadratic function slope as illustrated in FIG. 3 as frequency increases. The slope with the amount of attenuation decreasing is different depending on the wiring length and the characteristic impedance of the wiring. These are physical conditions and aging of the physical conditions is negligible. Variations in the change of attenuation are caused by conditions including variations in the dielectric constant of a board material, and a wiring line width, and are adjustable in a board manufacturing phase. In boards having tolerances defined, the magnitude of variations fall within a specific value range. Under these conditions, an equalizer 13a in the DFE unit 13 operates to compensate for degradation caused by the effect of reflection and attenuation created by a stub or impedance mismatch present in the wiring. Particularly when the effect of reflection depends on frequency, the DFE unit 13 operates to decrease attenuation in the frequency bandwidth.

Figure 4:
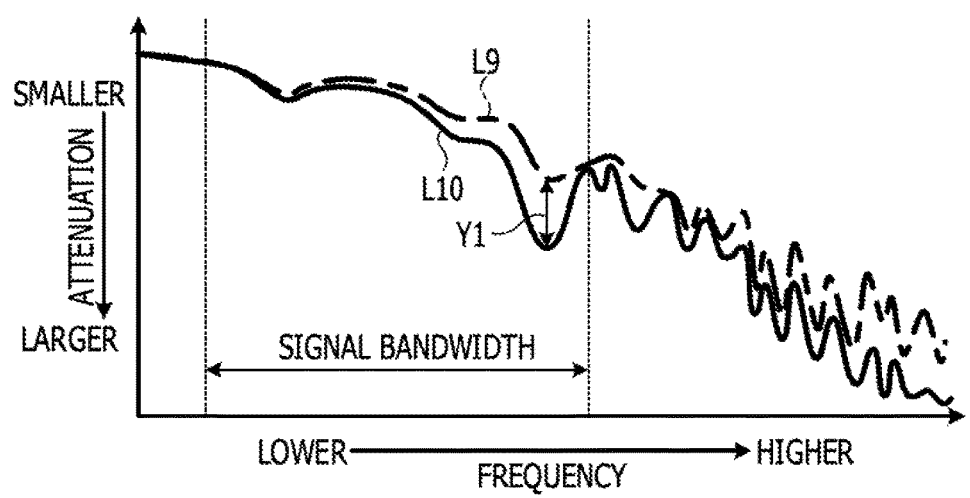
FIG. 4 illustrates degradation characteristics when a mating fault occurs in a connector.

FIG. 4 illustrates degradation characteristics when a mating fault occurs in the connector C2. In FIG. 4, the abscissa represents frequency while the ordinate represents attenuation. Referring to FIG. 4, curve L9 represents attenuation to frequency characteristics with the connector C2 free from any mating fault. Curve L10 represents attenuation to frequency characteristics with the connector C2 having a mating fault. An arrow-headed line Y1 represents degradation caused by an impedance mismatch of the connector C2.

The equalization mechanism has been described with reference to FIG. 2 and FIG. 3. FIG. 4 illustrates an example of degradation that is caused when a connector pin ages or suffers from a mating fault. The wiring of the connector C2 is performed using a via hole through wiring layers. The use of an intermediate layer as a wiring layer causes a stub as an excess of the via hole, and the stub creates a reflected signal. Characteristic degradation is thus caused on a frequency responsive to delay time associated with the reflected signal. A component, such as a connector, if inserted, causes an impedance mismatch. In response to the impedance mismatch, a signal may be reflected or attenuated. As a result, the level of the signal decreases at various frequencies within the transmission frequency bandwidth. However, under the same wiring condition, the transmission characteristics are similar. As long as a component usable on a predetermined frequency is used on a board whose impedance is controlled, characteristics vary in response to variations from component to component. For this reason, an entity (the transmission apparatus 1) that excessively degrades the transmission characteristics is less likely produced.

As long as such an entity is used in a normal condition, the transmission characteristics are compensated for by the equalization function, and the entity does not malfunction. If the connector suffers from a mating faulty, an impedance anomaly may occur in the plugged portion of the connector C2. On a particular frequency in a high-frequency band, a high amount of attenuation may be caused by the impedance anomaly. Such attenuation may be caused by reflection in the high-frequency band when characteristic impedance becomes abnormal, and changes as a capacitance or an inductance along the imaginary axis in the Smith Chart. As long as a pin of the connector C2 is in a contact state, the transmission of a signal is not affected in a low-frequency region close to a direct current, but an impedance anomaly may occur in a high-frequency band.

Figure 5:
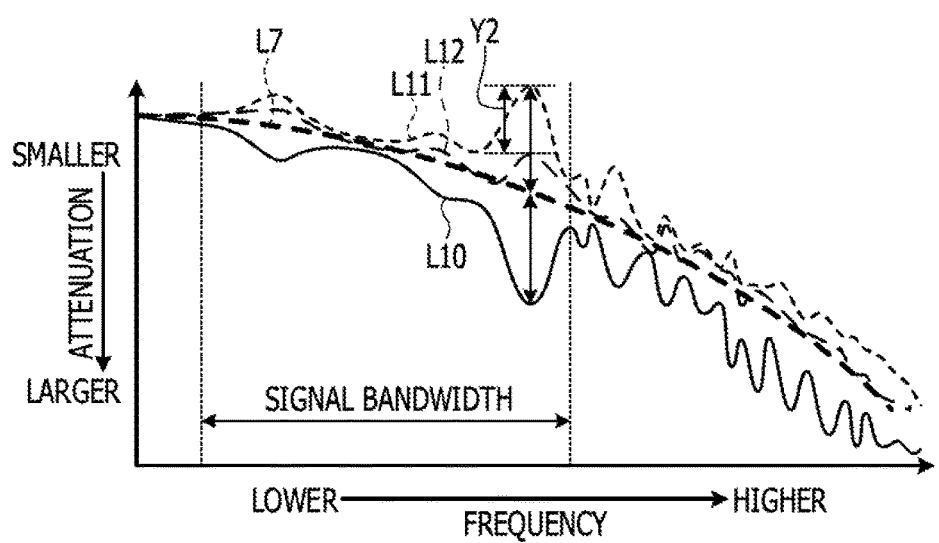
FIG. 5 illustrates equalization characteristics when a connector mating fault occurs.

FIG. 5 illustrates equalization characteristics when a connector mating fault occurs. In FIG. 5, the abscissa represents frequency while the ordinate represents attenuation. Referring to FIG. 5, curve L7 represents theoretical attenuation characteristics along the wiring length (attenuation to frequency characteristics). Curve L10 represents attenuation to frequency characteristics with the connector C2 having a mating fault. Curve L11 represents compensation amount (compensation characteristics) with the connector C2 having a mating fault. Curve L12 represents compensation amount (compensation characteristics) with the connector C2 having no mating fault. An arrow-headed line Y2 represents a difference between amounts of compensation of a normal mating state and a faulty mating state of the connector C2 (degradation difference). In other words, FIG. 5 illustrates a change in the equalization capability in the connector mating fault. Referring to FIG. 5, for convenience of explanation, the compensation by the linear equalizer is not accounted for, but the DFE unit 13 equalizes attenuation such that the attenuation follows a theoretical attenuation curve.

Figure 6:
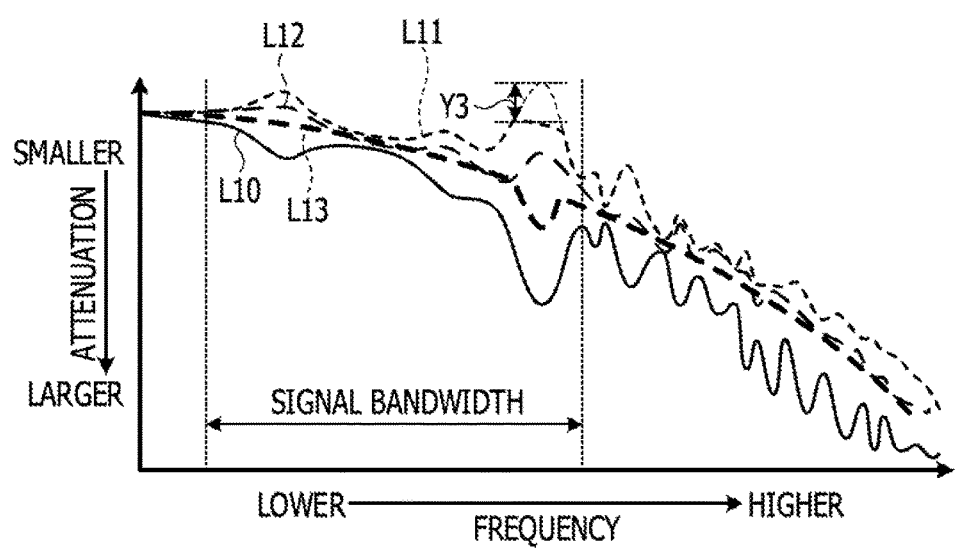
FIG. 6 illustrates other equalization characteristics when the connector mating fault occurs.

FIG. 6 illustrates other equalization characteristics when the connector mating fault occurs. In FIG. 6, the abscissa represents frequency while the ordinate represents attenuation. Referring to FIG. 6, curve L10 represents attenuation to frequency characteristics with the connector C2 having a mating fault. Curve L11 represents compensation amount (compensation characteristics) with the connector C2 having a mating fault. Curve L12 represents compensation amount (compensation characteristics) with the connector C2 having no mating fault. Curve L13 represents the transmission characteristics with the attenuation being compensated for. An arrow-headed line Y3 represents a decrease in the amount of compensation when an equalizer 13a not capable of equalizing all degraded amounts caused by the mating fault is used. FIG. 5 illustrates a state in which the degradation component caused by the mating fault is fully equalized. The equalizer 13a may have a lower equalization capability as a result of function restriction, and may not be capable of fully equalizing the mating fault of the connector C2. In such a case, as illustrated in FIG. 6, troughs are created in narrow bands. The signal path C loses flatness, and signals having frequencies responsive to the troughs are subject to errors.

Figure 7:
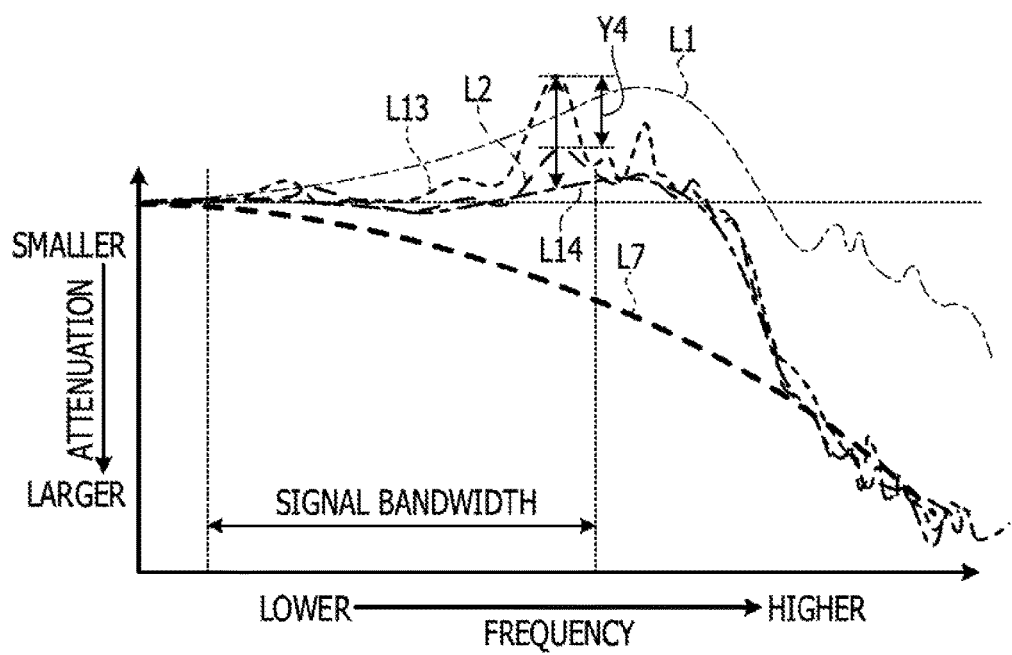
FIG. 7 illustrates other equalization characteristics including compensation of the linear equalizer.

FIG. 7 illustrates other equalization characteristics including compensation of the linear equalizer. In FIG. 7, the abscissa represents frequency while the ordinate represents attenuation. Referring to FIG. 7, curve L1 represents compensation characteristics of the linear equalizer. Curve L2 represents an amount of compensation by an equalization mechanism (the DFE unit 13) with the connector C2 having no mating fault. Curve L7 represents theoretical attenuation characteristics along the wiring length (attenuation to frequency characteristics). Curve L13 represents an amount of compensation by the equalization mechanism (the DFE unit 13) with the connector C2 having a mating fault. Curve L14 represents compensation results by the linear equalizer (compensation characteristics of a theoretical attenuation characteristic standard). An arrow-headed line Y4 represents a difference between amounts of compensation of a normal mating state and a faulty mating state of the connector C2 (degradation difference).

FIG. 7 illustrates the compensation mechanism for frequency degradation that is caused by the connector C2 having a mating fault, including a compensation effect provided by the linear equalizer. An equalization converging curve of the equalizer 13a in the DFE unit 13 is a characteristic curve that is provided by the linear equalizer that is configured to compensate for attenuation with distance. Referring to FIG. 7, if any degree of degradation advances on the signal path C, a change is desired in the equalization intensity of the equalizer 13a having a feedback mechanism, leading to variations in the tap coefficient. If the magnitude of variations exceeds a range permissible for the design tolerance of the system and board, the transmission apparatus 1 determines that any fault occurs or degradation advances on the signal path C. Fault detection is performed before a specific amount of equalization exceeds an equalization capability available for the system. Alternatively, the transmission apparatus 1 detects an incomplete mating as a faulty state prior to shipment by comparing the tap coefficient with a standard value specified for the system.

In addition to the above method, the transmission apparatus 1 may detect a fault by imparting a feedback function to the linear equalizer. The linear equalizer typically sets a fixed value to perform a fixed amount of compensation, and uses a function, such as DFE, on degradation that is not covered by that amount of compensation. If the equalization function, such as DFE, is not used, the transmission apparatus 1 monitors amplitude in the compensation results provided by the linear equalizer in a frequency band on the receiver side to perform automatic compensation. In such an arrangement, the transmission apparatus 1 monitors a fault, based on an amount of compensation after the automatic compensation. The transmission apparatus 1 performs not only the automatic compensation, but also monitors a fault using a periodic adjustment function responsive to a training signal, and a re-adjustment function in response to an external trigger.

Determination standard of the mating fault may be different depending on the configuration of the equalizer 13a. In the embodiment, the DFE unit 13 having the equalizer 13a is described as a typical adaptive equalizer. The DFE unit 13 is configured such that inter-symbol interference between signals that continue along the time axis is canceled. The equalization capability desired for the DFE unit 13 is different depending on a transmission speed and a wiring state. Since a complex path having a long wiring length of the signal path C and a large number of via holes penetrating wiring layers has a delayed convergence time of the inter-symbol interference, a large number of taps may be involved.

Figure 8:
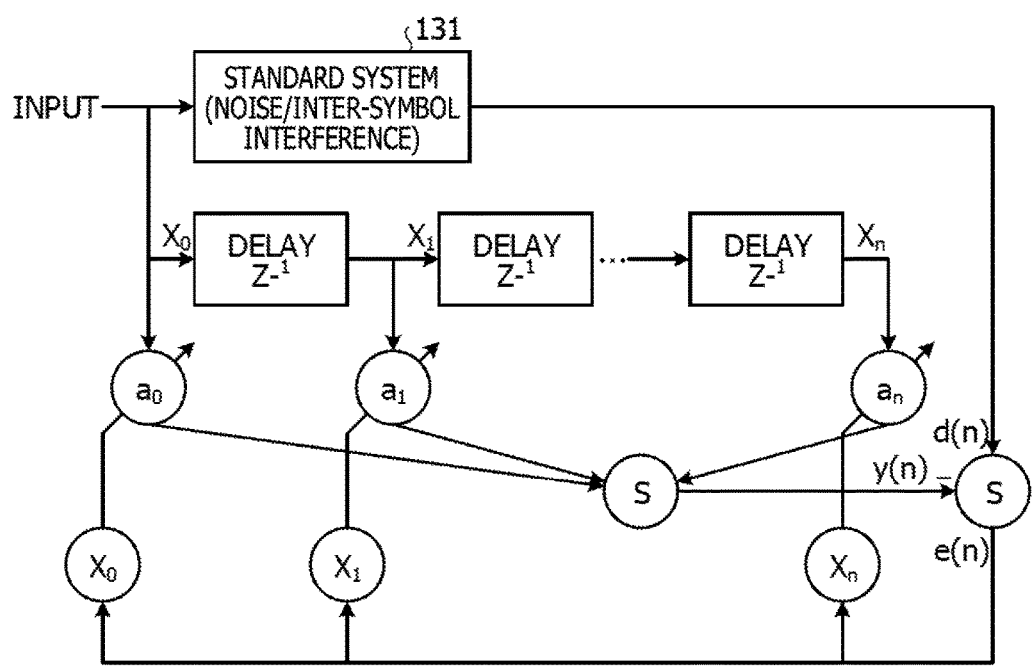
FIG. 8 illustrates an operation principle of a DFE unit.

FIG. 8 illustrates an operation principle of the DFE unit 13. Referring to FIG. 8, after entering a specific value to the standard system 131 to obtain a desired output d(n), the DFE unit 13 performs a filtering operation with a FIR model, thereby obtaining an estimated value y(n). The DFE unit 13 compares d(n) with y(n), calculating an error e(n). To update the tap coefficient, the DFE unit 13 correlates $X_0, X_1, \ldots, X_n$ with the error value e(n). For example, the DFE unit 13 calculates $e_0=e(n) \times X_0, e_1=e(n) \times X_1, \ldots, e_n=e(n) \times X_n$.

The DFE unit 13 is configured such that the inter-symbol interference created on the signal path C is canceled. If a change occurs in the signal path C, the DFE unit 13 changes and adapts a coefficient of a filter formed therein while operating the filter such that only an interference component responsive to the change is removed. More specifically, if an input signal or an amount of interference changes, the DFE unit 13 is configured to automatically update the coefficient. If the signal path C has idealistic characteristics, there is no inter-symbol interference. If a transfer function of the signal path is considered, the inter-symbol interference is caused because a residual voltage amplitude value in the next symbol (1 bit later) fails to become "0" in the impulse response. Each tap in the equalizer 13a sets the effect 1 symbol delay time later to be "0" by imparting, to a multiplier 1 symbol delay time later, a weight coefficient corresponding to an amount that cancels an amplitude remaining 1 symbol delay time later in the impulse response. In this way, the inter-symbol interference is reduced. A coefficient that removes the effect remaining 2 symbols later is imparted to the next tap. The further next tap operates to remove the effect 3 symbols later. As a technique available to update the coefficient, the DFE unit 13 updates the coefficient using least mean square (LMS) to converge the coefficient to an optimum value.

Figure 9:
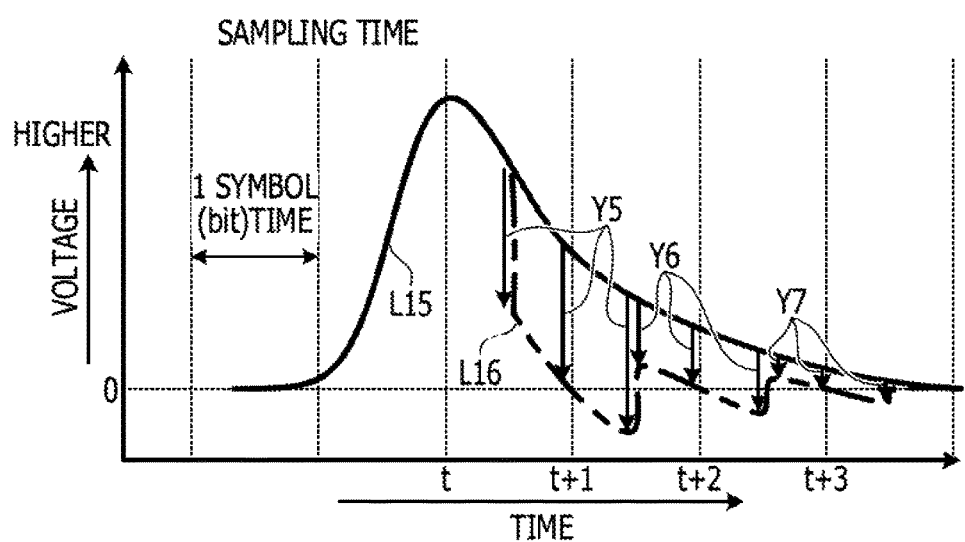
FIG. 9 illustrates how each tap with a coefficient imparted thereto performs compensation.

FIG. 9 illustrates how each tap with a coefficient imparted thereto performs compensation. Referring to FIG. 9, the abscissa represents time while the ordinate represents voltage. As illustrated in FIG. 9, curve L15 represents an impulse response wave obtained before the equalization by the DFE unit 13 along the time axis. Curve L16 represents an impulse response wave after the equalization by the DFE unit 13 along the time axis. An arrow-headed line Y5 represents an amount of compensation by a first tap, an arrow-headed line Y6 represents an amount of compensation by a second tap, and an arrow-headed line Y7 represents an amount of compensation by a third tap.

As illustrated in FIG. 9, the convergence of an impulse input to the signal path C is delayed, and this delay affects the next symbol (bit timing). In the signal path C in this state, each signal fails to converge to "0" at the next signal time. This voltage difference affects the signal (causing the inter-symbol interference). For this reason, an eye pattern in an open state is also interfered with a preceding symbol, and the open state is degraded. To control the inter-symbol interference, each tap of the DFE unit 13 performs control to set the amplitude during the next symbol time to be "0" by adding a signal having reverse gain responsive to an amount of interference. In this control, the amount of compensation increases as the inter-symbol interference increases. However, an amount of control increases as the inter-symbol interference increases. As a result, the signal suffers from noise more. Not only the signal several symbols earlier alone has an adverse effect but also the effect even more symbols earlier may be cumulative. In such a case, the control operation is no longer effective to control the increase in the inter-symbol interference.

The DFE unit 13 determines a coefficient anomaly, triggered by the state that a negative effect, such as an increase of noise by DFE, exceeds the equalization capability. To provide a margin in the system, the DFE unit 13 may use an intermediate state between an initial state and an abnormal state serving as determination standard of the coefficient anomaly. The coefficient is convergence results responsive to the transmission characteristics via a feedback loop. To shorten time to the convergence, the DFE unit 13 may perform initial training in accordance with a standard signal (pattern). Specifically, the DFE unit 13 may calculate fast an error residual during the impulse response by using a random and known signal as a signal along the time axis flat in terms of frequency.

Besides the above-described method, the DFE unit 13 of an adaptive type may include a maximum likelihood sequence estimator (MLSE) having a higher equalization capability to compensate for multiple reflection locations and impedance mismatch locations in the signal path C. The MLSE is an equalizer that determines a transmission signal sequence through Viterbi algorithm by treating the signal path C itself as a convolution coding device. Since these equalizers include IIR filter, and impart any weight coefficient to a filter tap, a coefficient increasing the degree of compensation theoretically damage stability. For this reason, in an actual system, the DFE unit 13 typically does not perform compensation above an upper limit by setting the upper limit to the coefficient, and may not result in a system that creates oscillation.

Concerning theoretical determination standard, the DFE unit 13 monitors a fault up to a coefficient as an upper limit from which a low-stability region extends, and disables equalization at the upper limit and beyond, and determines that a fault has been created in the signal path C. If the system clips the coefficient at the upper limit, the DFE unit 13 configures the upper limit to be monitoring standard. Alternatively, the DFE unit 13 configures an intermediate value between a normal state and the upper limit to be monitoring standard, and determines the coefficient according to the intermediate value. Alternatively, using the equalizer 13a, the DFE unit 13 may configure a fixed value during initial training and imparts characteristics reverse to the characteristics of the signal path C. The DFE unit 13 performs a determination operation using the convergence results of the initial training and the results of re-training performed after a time elapse from the initial training. Furthermore, the DFE unit 13 verifies the state that the results of the re-training have reached the addition upper limit of an internal compensation value (for example, one-fold of the internal compensation value) of the equalizer 13a, and treats that state as a faulty state. In this case, a specific margin may be permitted with respect to the upper limit.

As the coefficient calculation algorithm, for example, the DFE unit 13 in the receiver 10 may use least mean square (LMS), normalized least mean square (NLMS), recursive least square (RLS), mean square error (MSE), quadrative recursive-recursive least square (QR-RLS).

Figure 10:
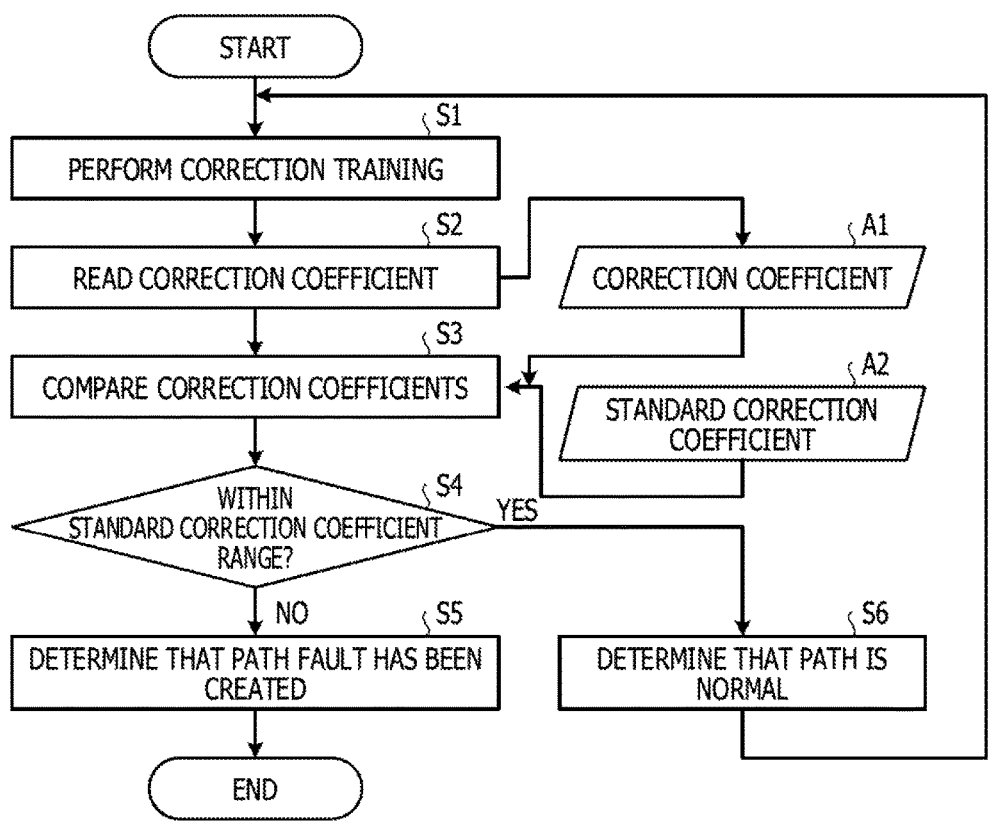
FIG. 10 is a flowchart illustrating a fault detection process performed by the transmission apparatus.

FIG. 10 is a flowchart illustrating a fault detection process performed by the transmission apparatus 1. Referring to FIG. 10, the transmission apparatus 1 detects a fault by comparing a correction coefficient (multiplication (weight) coefficient) imparted to an internal tap in the adaptive equalizer 13a with a standard value. In S1, the DFE unit 13 performs the correction training. In S2, the DFE unit 13 reads a correction coefficient A1 of the equalizer 13a. In S3, the comparator 16 compares the current correction coefficient A1 with a standard correction coefficient A2. In S4, the threshold value determination unit 18 determines whether the correction coefficient A1 falls within the range of the standard correction coefficient A2. If the correction coefficient A1 falls outside the range of the standard correction coefficient A2 (no branch from S4), the system fault detector 19 determines that a fault has occurred (S5). If the correction coefficient A1 falls within the range of the standard correction coefficient A2 (yes branch from S4), the system fault detector 19 determines that the path is normal (S6).

While no fault is detected in the path, the equalizer 13a consecutively updates the correction coefficient A1. Also the transmission apparatus 1 may determine the presence or absence of a fault in the path with a period longer than the update period of the correction coefficient A1 by the equalizer 13a.

As described above, the transmission apparatus 1 includes the connector C2, the equalizer 13a, the tap coefficient updating unit 13b, and the system fault detector 19. The connector C2 physically connects an inter-board high-speed signal path to the receiver 10. The equalizer 13a performs the equalization process on the received signal input to the receiver 10 via the connector C2, and outputs an equalized signal. The tap coefficient updating unit 13b calculates the tap coefficient of a receiver side DFE unit 13 that controls the operation of the equalizer 13a, and configures the tap coefficient in the equalizer 13a. Depending on whether the tap coefficient configured by the tap coefficient updating unit 13b satisfies a specific condition, the system fault detector 19 detects a mating fault of the signal path (such as an insufficient mated state).

The transmission apparatus 1 of the embodiment has a physical configuration including the connector C and the like for use as a high-speed signal path. The transmission apparatus 1 detects a fault state in the signal path caused by the physical configuration by monitoring the equalization capability of the equalizer 13a in the receiver 10. The transmission apparatus 1 associates signal paths according to the shape of the physical configuration of the connector C, and detects the location of a signal path fault as a physical location group. The transmission apparatus 1 thus determines whether a fault is related to the plugging of the connector as the physical configuration or a single signal path fault. In the determination method, the transmission apparatus 1 may use coefficient information to control the equalization capability of the equalization function prepared on the receiver side. By comparing the coefficient information with an initial state or a steady-state value, the transmission apparatus 1 detects an incomplete mated state that is difficult to find with a direct current component. The determination method is a method to extract control information from a compensation mechanism used on the receiver side, and is implemented by simple circuitry of one of a variety of mechanisms. In this way, the transmission apparatus 1 detects a mating fault in the connector having a physical configuration when high-speed signal transmission is performed between boards. By detecting a fault in the signal path, the transmission apparatus 1 controls the creation of an error in the signal transmission in advance. The transmission apparatus 1 detects degradation in the signal path, while detecting a degradation trend of many signal paths together with a physical locations of connector pins. The transmission apparatus 1 thus identifies a degradation cause, performs fault determination before a system failure occurs, and thus controls an event leading to a system failure.

The transmission apparatus 1 of the embodiment detects an incomplete mating of a connector in the signal path between units or within a unit. The transmission apparatus 1 thus detects as a signal path fault in the transmission band a mating fault state that is difficult to detect through a direct current resistance. As a result, the creation of an error or a system failure, caused by a mating fault during a manufacturing phase, is controlled in advance.

In the transmission apparatus 1 of the embodiment, after the initial configuration, periodic re-configuration or re-configuration responsive to an external trigger may be performed by the equalizer 13a, such as DFE, which continuously performs feedback, or by a fixed-configuration type equalizer 13a that is based on an initial training signal, or by an equalizer. The transmission apparatus 1 monitors a change in the tap coefficient subsequent to the re-configuration and in equalizer strength, and then performs fault determination in response to the monitoring results. When the equalizer tap coefficient of the receiver 10 is determined, the transmission apparatus 1 may monitor a fault not only continuously but also at irregular intervals, and may then suspend circuit operation. Particularly when multiple paths are monitored, path monitoring may be performed in a time-division manner as well as at irregular intervals. The number of monitoring circuits is thus reduced. For example, a single monitoring circuit is able to perform monitoring.

Using the coefficient information of DFE for use in signal compensation, the DFE unit 13 is configured by simply adding a memory mechanism of a standard value only and a difference detecting circuit. For this reason, the transmission apparatus 1 may easily include the DFE unit 13 in the receiver 10, thereby reducing an increase in power consumption. When the correction coefficient of the DFE unit 13 is monitored, the transmission apparatus 1 monitors a state that the correction coefficient has reached a maximum value without comparing the correction coefficient with an initial value or a value within a normal range, and then determines that a fault that the correction coefficient exceeds the upper limit of the compensation capability occurs. In such a case, a configuration element storing the initial value and a comparison circuit are dispensed with, leading to a reduction in circuit or power consumption. The transmission apparatus 1 detects the connector mating fault and further detects a faulty junction of a connected device (such as faulty soldering or bonding) if a particular signal path is faulty. If the junction is incomplete but established in a sense of DC contact in the initial state, the degradation determination and the detection of advanced degradation may be detected.

The transmission apparatus 1 of the embodiment includes a feedback-type equalizer 13a and an equalizer in a mechanism receiving a transmission signal monitors a gain setting value of a correction amplifier used for equalization, and thus checks for a faulty state. With the characteristics of the equalizer 13a and the equalizer, the transmission apparatus 1 detects a mating fault of the connector. The transmission apparatus 1 monitors an incomplete mating state of the connector between the signal paths, and reliably allows test and detection to be performed during the manufacturing phase. As a result, the transmission apparatus 1 controls a problem in the system that could occur as the mating fault advances with the system in service.

The transmission apparatus 1 includes the DFE unit 13 in the receiver 10, compares each tap coefficient with a design value, and determines that a fault occurs if the tap coefficient falls outside a permissible range. In the state that the connector is correctly mated, the compensation mechanism on the receiver side and the compensation mechanism in the DFE unit 13 operate in a manner such that degradation depending on frequency of a signal path from the transmitter side to the receiver side is compensated for. The signal path fault depends on the wiring state, in other words, degradation is caused by signal reflection at an impedance mismatch location or stub. The signal path fault is also affected by the dielectric constant of a board material, and variations in the thickness of the board, and a tolerance level of manufacturing accuracy of the wiring. But the same wirings on different boards may indicate similar characteristics. For this reason, the compensation functions on the receiver sides may have similar compensation level. Each tap coefficient imparted to an internal circuit is a coefficient difference responsive to the manufacturing tolerance level of the boards.

Different wirings on the same board may be different in terms of characteristics of the compensation functions applied thereto. In accordance with the embodiment, a normal state on the same path is referenced as a standard. If the connector C2 is in a normal state, the transmission apparatus 1 defines a permissible value indicating characteristic similarity in fault determination by calculating a tap coefficient that gives an equalization capability that covers variations falling within a range of $3\sigma$ or $5\sigma$ as board manufacturing characteristics.

The transmission apparatus 1 updates the tap coefficient using a technique of updating the tap coefficient in accordance with the accumulation of highly random signals of in a transmission and reception state (normal communication state) for a long period of time, or a technique of updating the tap coefficient by performing training at regular intervals. When the tap coefficient is continuously updated, the transmission apparatus 1 continuously performs fault detection by continuously performing the determination. On the other hand, if the tap coefficient is used in a fixed manner to provide a given level of equalization capability, the transmission apparatus 1 updates the equalization capability by performing training with a highly random signal periodically or in response to an externally controlled trigger, and then detects a fault at the updating timing.

The equalization capability is not infinite, but has a limit that is determined by the number of taps inside a filter, a configuration and layout of multipliers, multiplication capability, and an algorithm that selects a tap coefficient. For this reason, the tap coefficient has an upper limit. The transmission apparatus 1 may perform fault detection in accordance with a tap coefficient that sticks to the upper limit. A connector, depending on the type thereof, has paths that allow multiple signals to flow therethrough to a single component. In such a case, the connector has multiple pins. If the connector has a mating fault, a single pin only may be faulty as a result of advanced degradation of material. If the degradation is advanced by any pollutant, multiple pins may suffer from a similar trend of degradation. By monitoring multiple paths, the transmission apparatus 1 may monitor a fault at a higher accuracy level. In view of a physical configuration of a connector, a single pin only is less likely to be incompletely mated. If such an incomplete mating happens, multiple pins surrounding that pin may also be incompletely mated. By monitoring a fault on the tap coefficients of DFE on multiple paths, the transmission apparatus 1 may determine whether a created fault is caused by a half-unplugged connector or by another factor.

As described in detail below, the system fault detector 19 in the transmission apparatus 1 may concurrently monitor the coefficients of multiple signal paths, and, based on the monitoring results, may determine whether the mating fault is created in a single signal path or multiple signal paths. In this way, at a higher accuracy level, the transmission apparatus 1 may monitor degradation caused by a pollutant. Note that if the degradation is caused by a pollutant, multiple pins tend to suffer from a similar degradation trend.

The system fault detector 19 in the transmission apparatus 1 may associate each signal path with the physical location of a connector pin of the connector C2, and may detect a faulty state of the physical location and the degree of concentration of faulty pins. In this way, the user may find a localized state of the connector mating.

The system fault detector 19 in the transmission apparatus 1 may monitor the coefficient with a specific period. When the coefficient exceeds a tolerance value (system tolerance value) of the equalizer 13a, the transmission apparatus 1 determines that the mating fault has been detected. In this way, the transmission apparatus 1 may detect the mating fault not only when the tap coefficient is continuously updated, but also when the tap coefficient is used in a fixed manner to achieve a specific level of equalization capability.

The system fault detector 19 in the transmission apparatus 1 may compare the coefficient at the initial setting of the equalizer 13a or during the initial training with a standard value to detect an early fault in the equalizer 13a. The system fault detector 19 may also perform re-training of the coefficient with a specific period of time, and check a coefficient that reflects the results of the re-training. In this way, the transmission apparatus 1 may determine whether the fault has advanced in the signal path.

The system fault detector 19 in the transmission apparatus 1 compares each of multiple coefficients in the equalizer 13a with the upper limit value thereof. When at least one of the coefficients sticks to the upper limit value thereof, the transmission apparatus 1 may determine that a fault that is not covered by the equalization capability of the equalizer 13a has been created. In this way, even if the tap coefficient has the upper limit value thereof, the transmission apparatus 1 may determine a fault, based on the fact that the tap coefficient sticks to the upper limit value thereof.

The determination standard values may be a value where the raised level of noise exceeds an amount of correction of auto-interference in the method of the equalizer 13a, or a value of a coefficient that causes a filter to be off a stable state. Alternatively, the determination using coefficients in a wider range may be possible by using as a coefficient of the equalizer 13a a value falling outside a range of characteristic variations of a material with the range having as a center value a convergence coefficient through the initial training in the normal state.

First Modification

Figure 11:
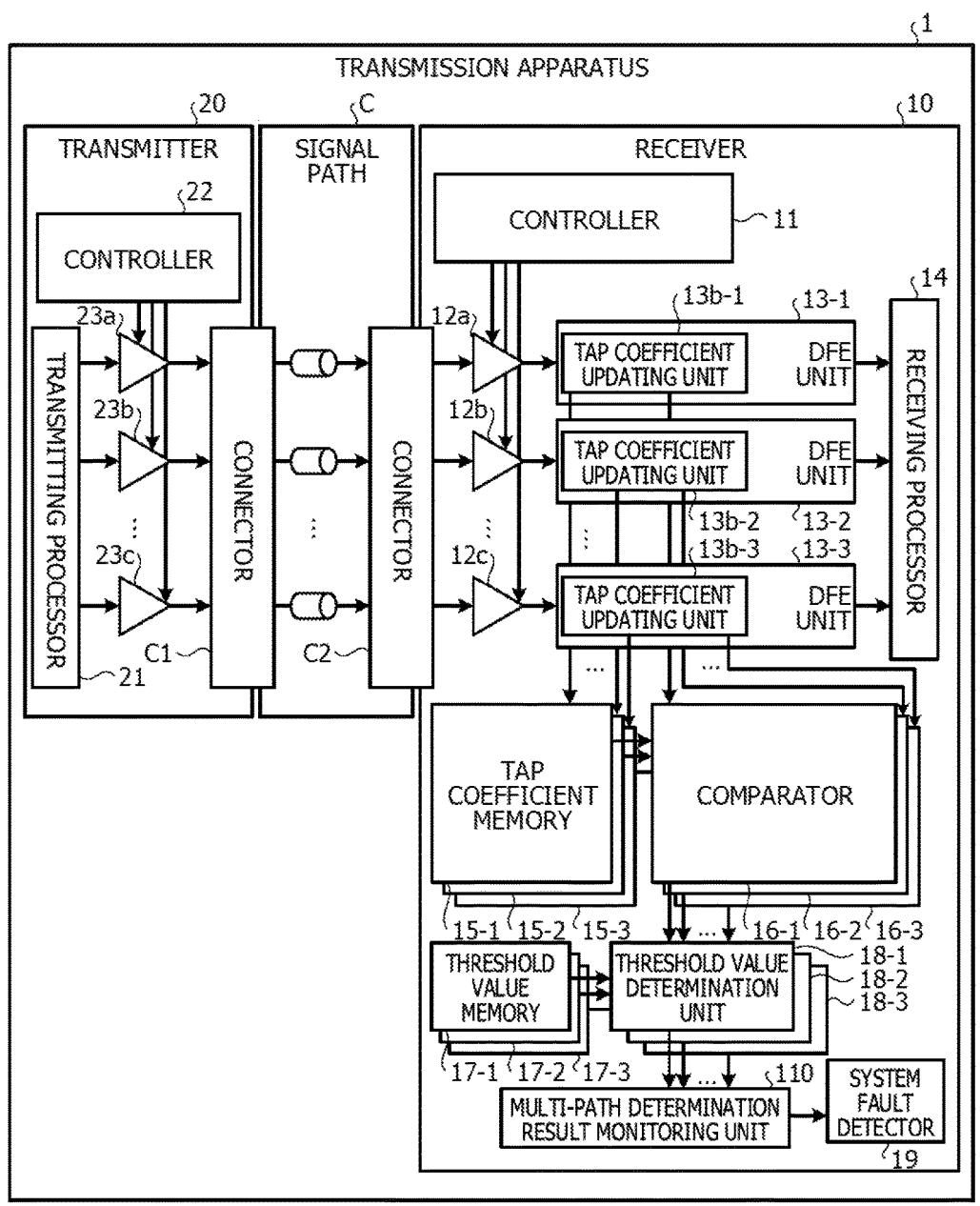
FIG. 11 illustrates a configuration of a transmission apparatus of a first modification.

A first modification is described below. FIG. 11 illustrates a configuration of a transmission apparatus 1 of the first modification. The transmission apparatus 1 of the first modification includes configuration elements identical to those of the transmission apparatus 1 of FIG. 1. Referring to FIG. 11, configuration elements in the first modification identical to those of the embodiment are designated with the same reference numerals and the detailed discussion thereof is omitted herein. A difference between the first modification and the embodiment is that multiple paths are monitored in the detection of the mating fault in the connector C2. More specifically, the connector mating fault may include a pin fault. The connector mating fault may also include a connector that is not sufficiently plugged to a specific location. In such a case, multiple paths transmitting signals may suffer from a fault. For this reason, by monitoring the multiple paths, the transmission apparatus 1 of the first modification may identify not only a fault in the signal path C, but also a mating fault of the connector C2 as a cause of the fault in the signal path C.

Referring to FIG. 11, the transmission apparatus 1 of the first modification verifies the tap coefficient at each path, and detects the presence or absence of faults in the multiple locations by determining difference information of the tap coefficients at a time. Based on the detection results, the transmission apparatus 1 may determine that a slant insertion of a connector results in incomplete mating if a fault is created mainly at a path assigned to the end of the connector C2. As a result, fault detection is possible during the manufacturing phase, and product quality at shipment is improved. The transmission apparatus 1 of the first modification monitors the progress of the mating fault of the connector C2, and thus detects the progress of the degradation caused by vibrations or mating fault, and characteristic degradation of the signal path C that is associated with an impedance fault caused by material degradation at a mating location. Since the transmission apparatus 1 of the first modification detects the fault before a system failure that could occur when the equalization capability is exceeded, the system is stably operated.

The discussion of the configuration of the first modification identical to that of the embodiment is not repeated. The connector C2 includes multiple paths, and concurrently inputs and outputs multiple signals. The connector C2 includes one or more connectors. The transmission apparatus 1 of the first modification includes multiple paths, and analog compensation units include separate mechanisms respectively for the paths, and each analog compensation unit for the respective path includes an amplifier and a linear equalizer. The transmission apparatus 1 of the first modification further includes DFE units 13-1, 13-2, and 13-3 as analog waveform compensation mechanisms. Each of the DFE units 13-1, 13-2, and 13-3 may vary compensation characteristics in response to an input signal. To determine the compensation characteristics, the DFE units 13-1, 13-2, and 13-3 include tap coefficient updating units 13b-1, 13b-2, and 13b-3, respectively. The tap coefficient updating units 13b-1, 13b-2, and 13b-3 control each tap of digital filters that control IIR filter characteristics.

As described above, the transmission apparatus 1 of the first modification includes the DFE unit 13 for each of multiple paths, and each of the DFE units 13-1, 13-2, and 13-3 in the compensation units of the paths includes multiple taps. The transmission apparatus 1 determines the presence or absence of a fault on each of the DFE units 13-1, 13-2, and 13-3 using a threshold value, and further performs the determination operation on each of the multiple taps present in each of the DFE units 13-1, 13-2, and 13-3. Each of threshold value determination units 18-1, 18-2, and 18-3 determines whether a multiplication coefficient imparted to each tap of the filter of each of the DFE units 13-1, 13-2, and 13-3 has reached a saturation state. The determination results are collected by a multi-path determination result monitoring unit 110 and then output from the multi-path determination result monitoring unit 110 to the system fault detector 19.

Figure 12:
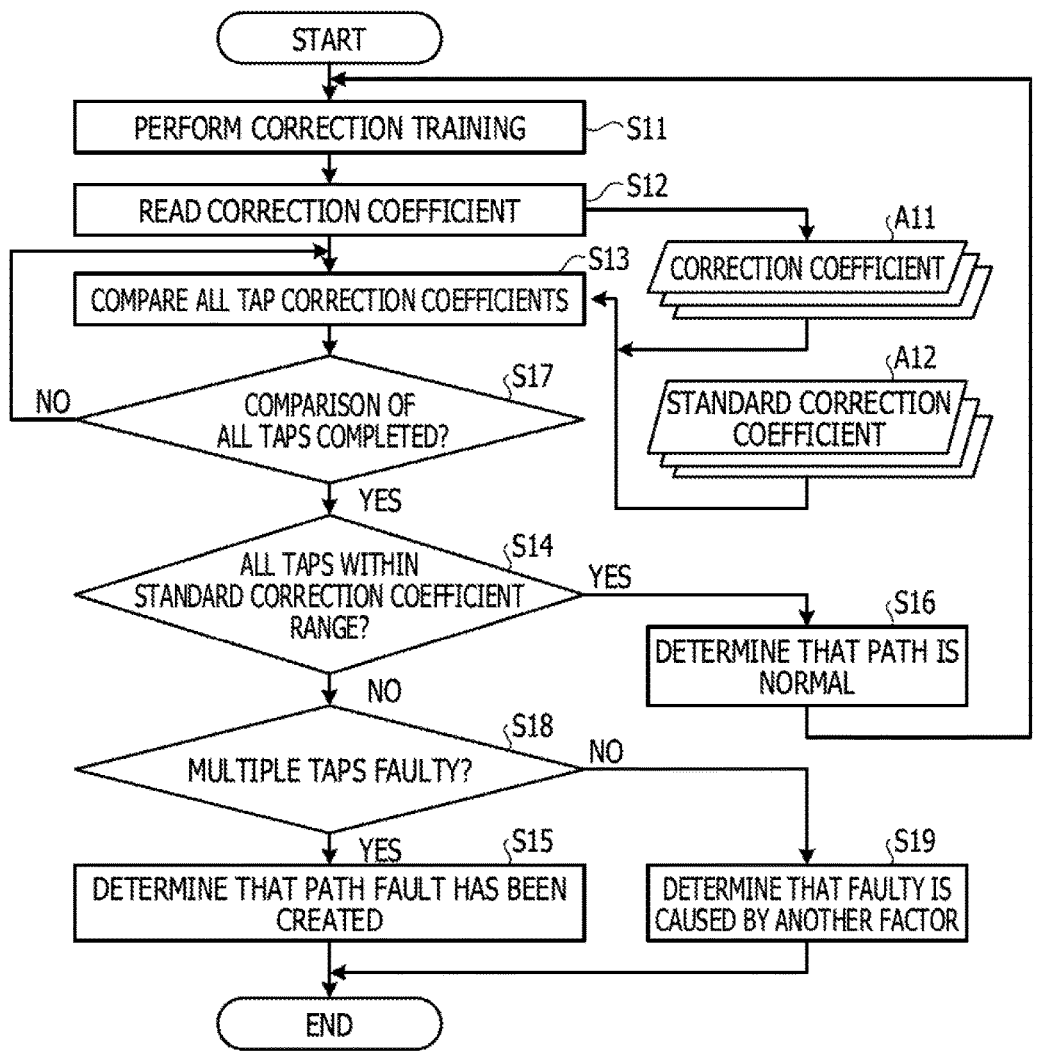
FIG. 12 is a flowchart illustrating a process of the transmission apparatus of the first modification.

FIG. 12 is a flowchart illustrating a process of the transmission apparatus 1 of the first modification. FIG. 12 illustrates multiple identical steps that have been discussed for the process of the embodiment with reference to FIG. 10, and the identical steps have the same final reference numbers, and the discussion thereof is omitted. More specifically, operations in steps S11 through S16 of FIG. 12 correspond to operations in steps S1 through S6 of FIG. 10, respectively.

The comparator 16 compares correction coefficients A11 of all taps in each of the DFE units 13-1, 13-2, and 13-3 of all paths with a standard correction coefficient A12 (S13), and determines whether the comparison operation of all taps has been completed (S17). If the determination results indicate that the comparison operation of all taps has been completed (yes branch from S17), processing proceeds to S14. If the determination results indicate that the comparison operation of all taps has not been completed (no branch from S17), the operation in S13 and subsequent operations are performed again. In S18, the system fault detector 19 determines whether multiple taps are faulty. If the system fault detector 19 determines that the multiple taps are faulty (yes branch from S18), the system fault detector 19 determines a path fault has been created (S15). If the system fault detector 19 determines that the multiple taps are not faulty (no branch from S18), the system fault detector 19 determines that the fault has been created by another factor (S19).

As described above, the transmission apparatus 1 of the first modification detects the mating fault by verifying whether the mating fault of the physically plugged connector C2 having multiple pins affects one or more signals. In this way, the mating fault detection is performed at a higher accuracy level in view of the multiple signal paths C.

Second Modification

Figure 13:
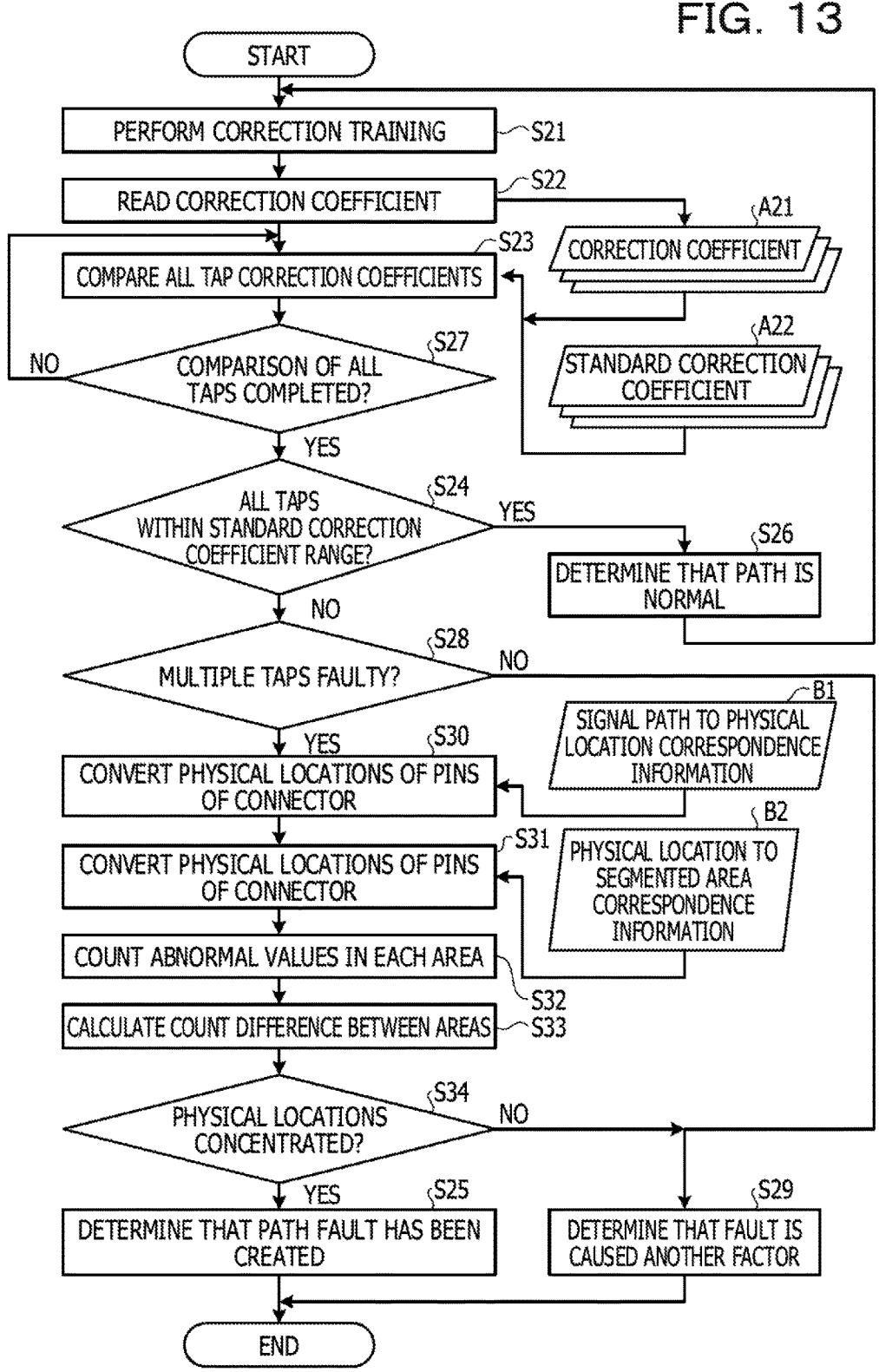
FIG. 13 is a flowchart illustrating a process of a transmission apparatus of a second modification.

A second modification is described below. FIG. 13 is a flowchart illustrating a process of the transmission apparatus 1 of the second modification. FIG. 13 illustrates multiple identical steps that have been discussed for the process of the first modification with reference to FIG. 12, and the identical steps have the same final reference numbers, and the discussion thereof is omitted. More specifically, operations in steps S21 through S29 of FIG. 13 correspond to operations in steps S11 through S19 of FIG. 12, respectively.

In S30, the system fault detector 19 converts the physical locations of pins of the connector C2 in accordance with signal path to physical location correspondence information B1. FIG. 14 illustrates an example of the signal path to physical location correspondence information B1 of a second modification. Referring to FIG. 14, the signal path to physical location correspondence information B1 associates at least the name of a received signal (Lane-1_P, for example) with a connector number (CN1, for example) and a pin location (C28, for example). The signal path to physical location correspondence information B1 may also associate the name of the received signal with a target port (1, for example), a differential signal polarity (Positive channel, for example), and remark information (pin at column C and row 28, for example).

In S31, the system fault detector 19 converts the physical locations of the pins of the connector C2 in accordance with physical location to segmented area correspondence information B2. FIG. 15 illustrates an example of the physical location to segmented area correspondence information B2 of the second modification. Referring to FIG. 15, the physical location to segmented area correspondence information B2 associates at least a connector number (CN1, for example), a pin location column (-, for example), a pin location row (1, for example) with a determination segmented area (1, for example). The physical location to segmented area correspondence information B2 may further associate the parameter described above with remark information (same area expanding from column A through column G). The transmission apparatus 1 calculates a deviation of the physical locations of the pins of the connector C2.

The system fault detector 19 counts abnormal values within each determination segmented area (S32), and calculates a count difference of abnormal values between the determination segmented areas (S33). In S34, the system fault detector 19 determines in response to the calculation results whether the physical locations of the pins of the connector C2 where a fault occurs are concentrated or not. If there is a concentration of faulty pins (yes branch from S34), the system fault detector 19 determines that a path fault has been created (S25). If there is no concentration (no branch from S34), the system fault detector 19 determines that the created fault is caused by another factor (S29).

As described above, the transmission apparatus 1 of the second modification performs the determination by accounting for not only the operation of the transmission apparatus 1 of the first modification but also information indicating the physical locations of the pins of the connector C2 as a determination factor. More specifically, the transmission apparatus 1 of the second modification performs fault detection by detecting not only a mating fault spreading across multiple pins on the physically plugged connector C2 having the multiple pins, but also by detecting a fault by referencing a correlation of the physical locations of the pins of the connector C2. In this way, the transmission apparatus 1 detects a mating fault as well as a mating fault state, such as a slant insertion of the connector C2.

Third Modification

Figure 16:
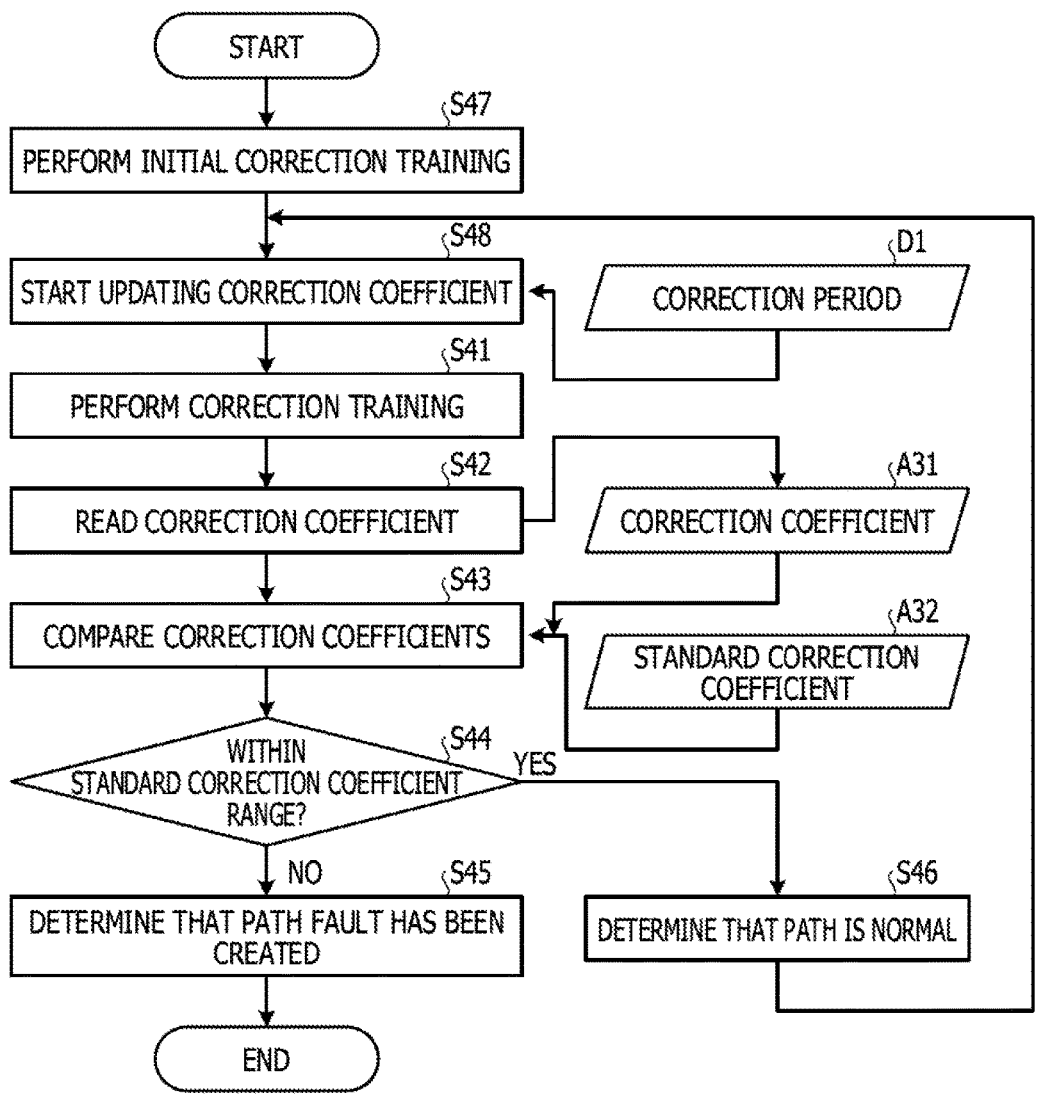
FIG. 16 is a flowchart illustrating a process of a transmission apparatus of a third modification.

A third modification is described below. FIG. 16 is a flowchart illustrating a process of a transmission apparatus 1 of the third modification. FIG. 16 illustrates multiple identical steps that have been discussed for the process of the embodiment with reference to FIG. 10, and the identical steps have the same final reference numbers, and the discussion thereof is omitted. More specifically, operations in steps S41 through S46 of FIG. 16 correspond to operations in steps S1 through S6 of FIG. 10, respectively.

Referring to FIG. 16, the transmission apparatus 1 of the third modification includes an adaptive equalizer 13a having a fixed correction coefficient. The adaptive equalizer 13a treats separately a timing when a correction coefficient to be imparted to an internal tap (a tap coefficient, for example) in the adaptive type DFE unit 13 having a fixed correction coefficient is calculated from an extraction timing when a tap coefficient to be compared with a standard correction coefficient is extracted. More specifically, the DFE unit 13 performs initial correction training in S47, and starts updating the correction coefficient for a correction period D1 in S48. The subsequent operations are identical to the embodiment (see FIG. 10), and the discussion thereof is omitted. The transmission apparatus 1 of the third modification reduces resources used for determination and power consumption by lengthening the determination period with reference to the symbol time as described above. Concerning circuitry, the transmission apparatus 1 of the third modification is without a determination mechanism for multi-signal paths, and intermittently operates a minimum unit of circuit in each signal path C in time-division control. The transmission apparatus 1 of the third modification is thus simplified in circuitry and consumes less power.

Fourth Modification

Figure 17:
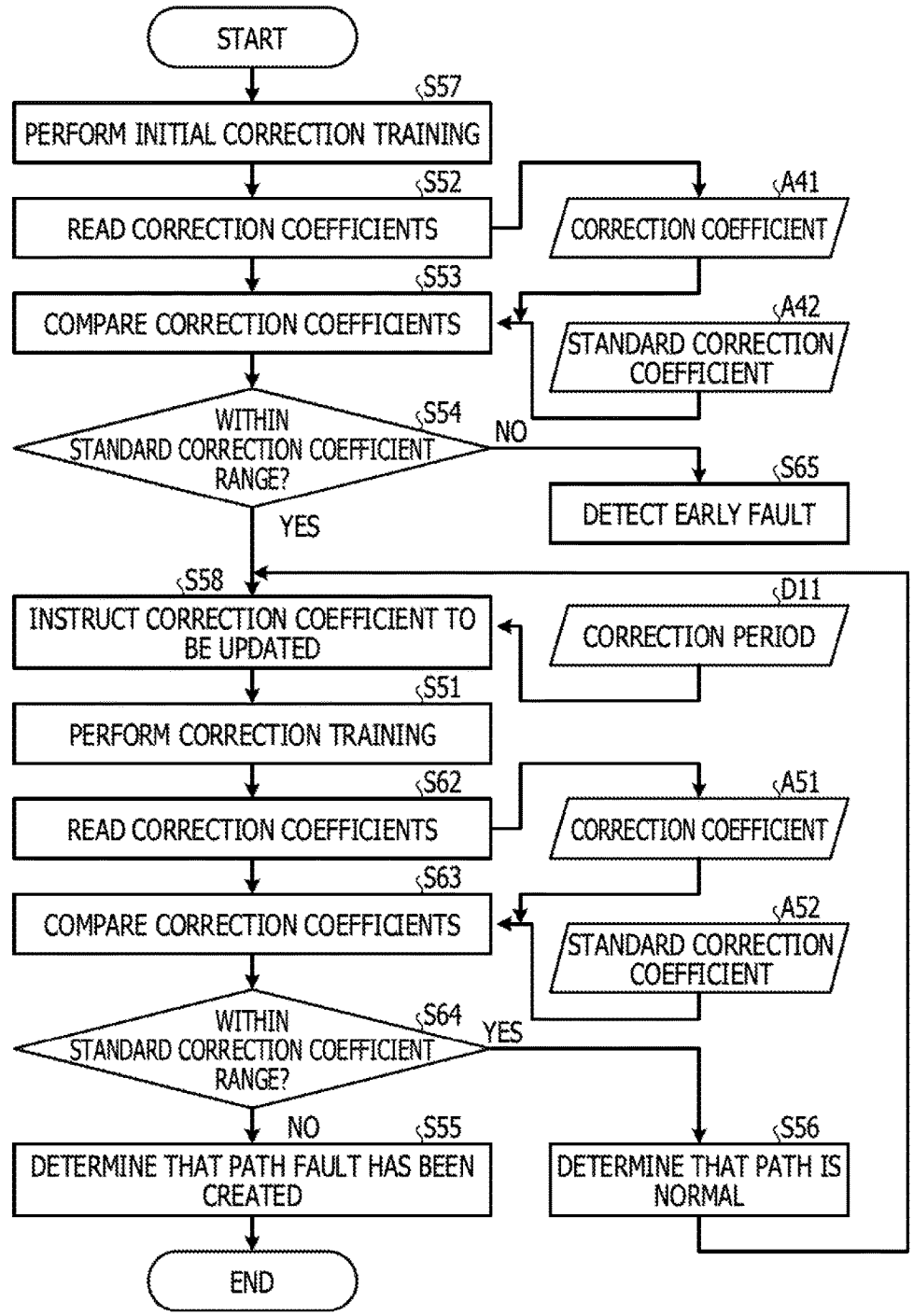
FIG. 17 is a flowchart illustrating a process of a transmission apparatus of a fourth modification.

A fourth modification is described below. FIG. 17 is a flowchart illustrating a process of a transmission apparatus 1 of the fourth modification. FIG. 17 illustrates multiple identical steps that have been discussed for the process of third modification with reference to FIG. 16, and the identical steps have the same final reference numbers, and the discussion thereof is omitted. More specifically, operations in step S51 through S58 of FIG. 17 correspond to operations in steps S41 through S48 of FIG. 16, respectively, and operations in steps S62 through S64 of FIG. 17 correspond to operations in steps S42 through S44 of FIG. 16.

As described in FIG. 17, the transmission apparatus 1 of the fourth modification includes an adaptive equalizer 13a having a fixed correction coefficient. The adaptive equalizer 13a verifies an early faulty state through the initial correction training. The transmission apparatus 1 detects an early fault by comparing with the standard correction coefficient a calculated value of the correction coefficient that is imparted to an internal tap when the fixed correction coefficient is updated. More specifically, the threshold value determination unit 18 determines in S54 whether a correction coefficient A41 falls within the range of a standard correction coefficient A42. If the correction coefficient A41 falls outside the range of the standard correction coefficient A42 (no branch from S54), the system fault detector 19 detects a creation of an early fault (S65). If the correction coefficient A41 falls within the range of the standard correction coefficient A42 (yes branch from S54), the system fault detector 19 instructs the correction coefficient A41 to be updated during a correction period D11 (S58). The subsequent operations are identical to those of the third modification (see FIG. 16), and the discussion thereof is thus omitted. The transmission apparatus 1 of the fourth modification not only performs determination using only the adaptive-type equalizer 13a that continuously performs connection through feedback, but also performs re-configuration periodically or in response to an external trigger after the initial configuration. The transmission apparatus 1 then monitors the tap coefficient after re-configuration, and a change in the equalizer strength, and monitors a fault in accordance with the monitoring results. The transmission apparatus 1 of the fourth modification may detect a mating fault in the connector C2 in an arrangement where adaptation to reduce power consumption in a path that suffers less from instantaneous variations, such as in an arrangement where the signal path C is mounted on a board.

Fifth Modification

Figure 18:
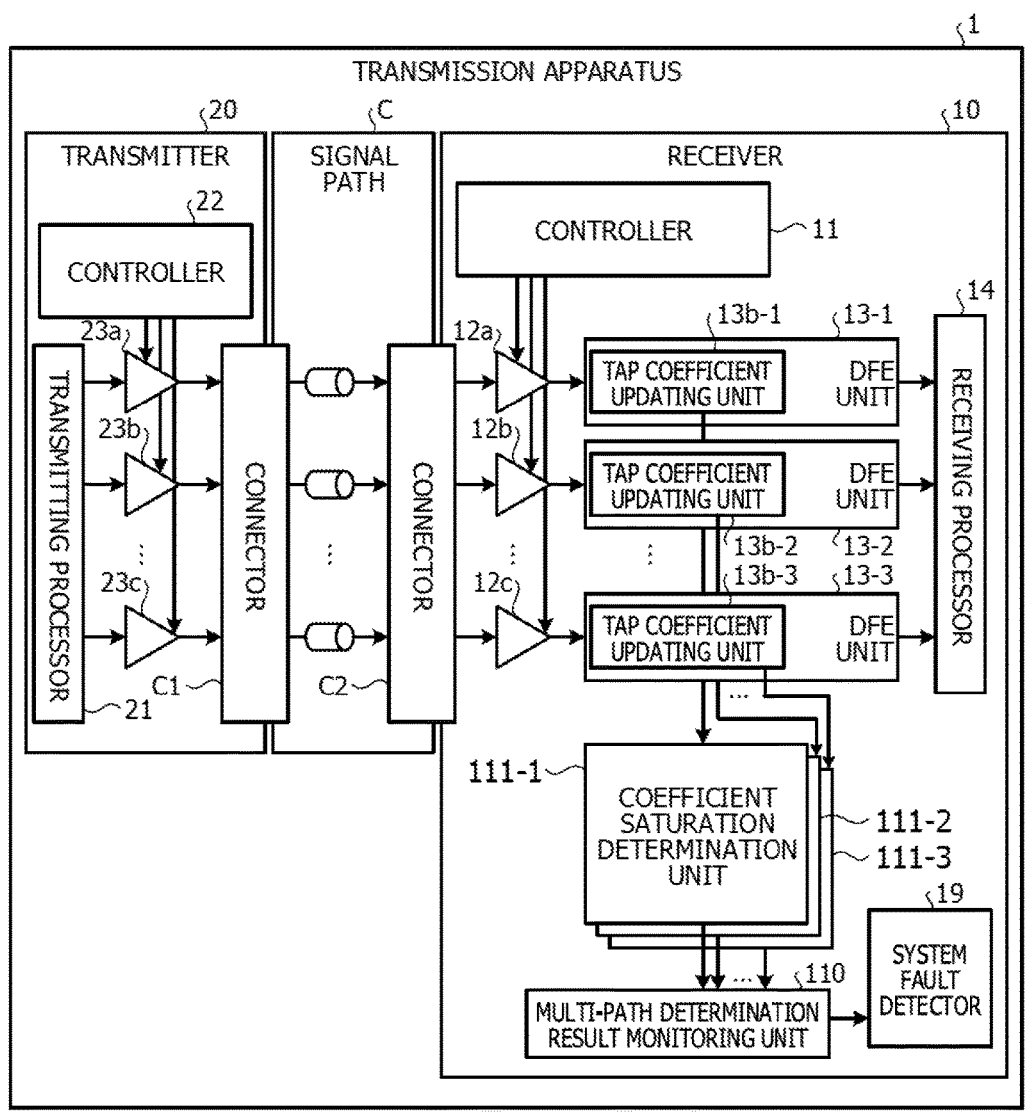
FIG. 18 illustrates a configuration of a transmission apparatus of a fifth modification.

A fifth modification is described below. FIG. 18 illustrates a configuration of a transmission apparatus 1 of the fifth modification. The transmission apparatus 1 of the fifth modification is identical in configuration to the transmission apparatus 1 of the first modification of FIG. 11 except that coefficient saturation determination units 111-1, 111-2, and 111-3 are included instead of the threshold value determination units 18-1, 18-2, and 18-3. As illustrated in FIG. 18, configuration elements of the fifth modification identical to those of the first modification are designated with the same reference numerals and the detailed discussion thereof is omitted herein. Each of the coefficient saturation determination units 111-1, 111-2, and 111-3 determines whether a multiplication coefficient to be imparted to each tap of a filter of each of the DFE units 13-1, 13-2, and 13-3 has reached a saturation state. The determination results are collected by the multi-path determination result monitoring unit 110 and are then output from the multi-path determination result monitoring unit 110 to the system fault detector 19.

Figure 19:
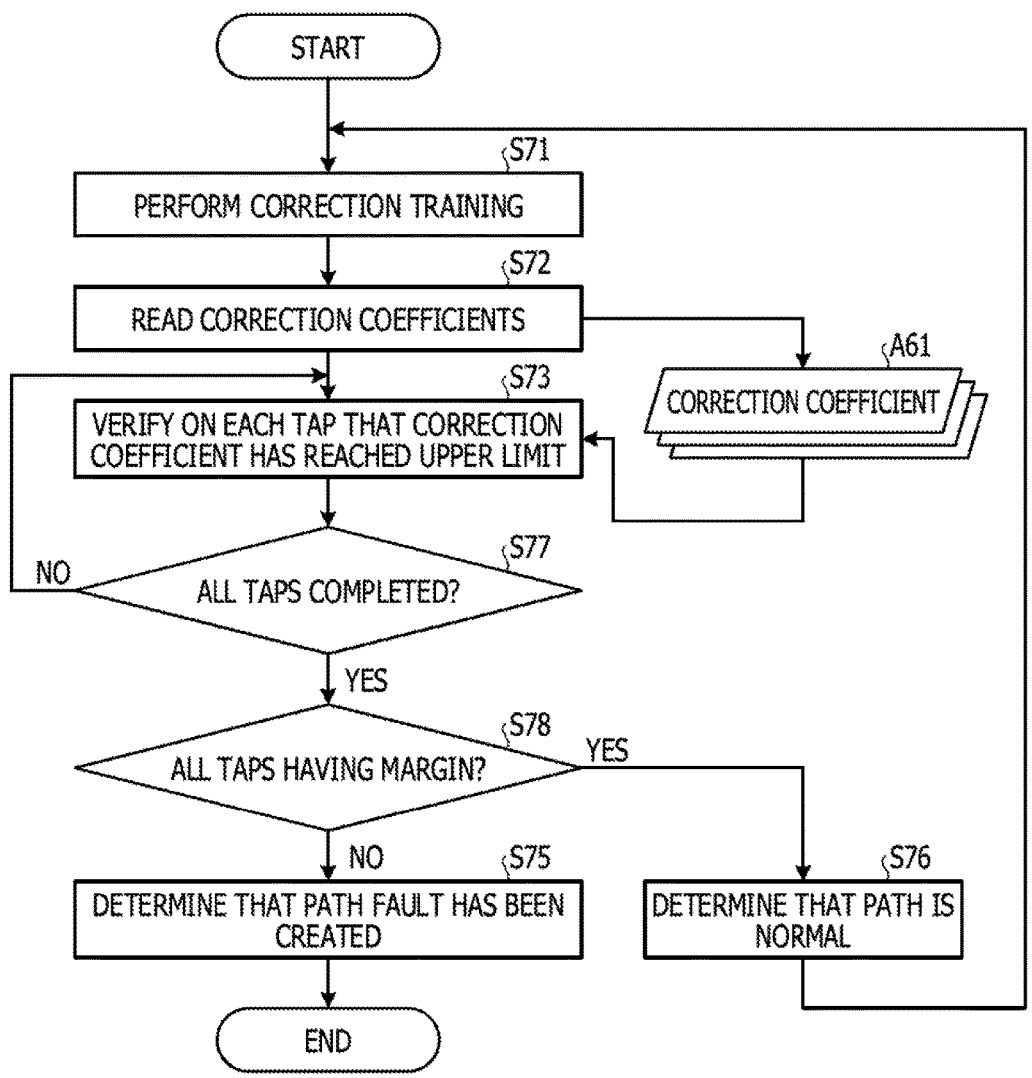
FIG. 19 is a flowchart illustrating a process of the transmission apparatus of the fifth modification.

FIG. 19 is a flowchart illustrating a process of the transmission apparatus 1 of the fifth modification. FIG. 19 illustrates multiple identical steps that have been discussed for the process of the first modification with reference to FIG. 12, and the identical steps have the same final reference numbers, and the detailed discussion thereof is omitted. More specifically, operations in steps S71, S72, S75, and S77 of FIG. 19 correspond to operations in steps S11, S12, S15, and S17 of FIG. 12.

As illustrated in FIG. 19, the transmission apparatus 1 of the fifth modification detects a fault by verifying that a correction coefficient (multiplication (weight) coefficient) imparted to each tap has reached a limit (an upper limit value) of the stable region of each amplifier, and that providing a correction coefficient beyond that limit is no longer possible. In other words, when the transmission apparatus 1 of the fifth modification monitors the correction coefficient of the DFE unit 13, the transmission apparatus 1 of the fifth modification does not compare the correction coefficient of the DFE unit 13 with the initial value or a value within a normal range. The transmission apparatus 1 detects the creation of a fault that exceeds the upper limit of the correction capability by monitoring a state that a maximum value of the correction coefficient has been reached. More specifically, in S73, the comparator 16 verifies on each tap whether the correction coefficient has reached the upper limit. In S78, the system fault detector 19 determines whether each of the correction coefficients of all taps still has a margin. If each of the correction coefficients still has a margin (yes branch from S78), the system fault detector 19 determines that the path is normal (S76). On the other hand, if each of the correction coefficients does not have a margin, in other words, if at least one correction coefficient sticks to the upper limit (no branch from S78), the system fault detector 19 determines that t a path fault has been created (S75). The transmission apparatus 1 of the fifth modification is free from an operation of storing the initial value or the value within the normal range for the determination and a comparator circuit. As a result, circuit scale and power consumption are thus reduced.

Sixth Modification

Figure 20:
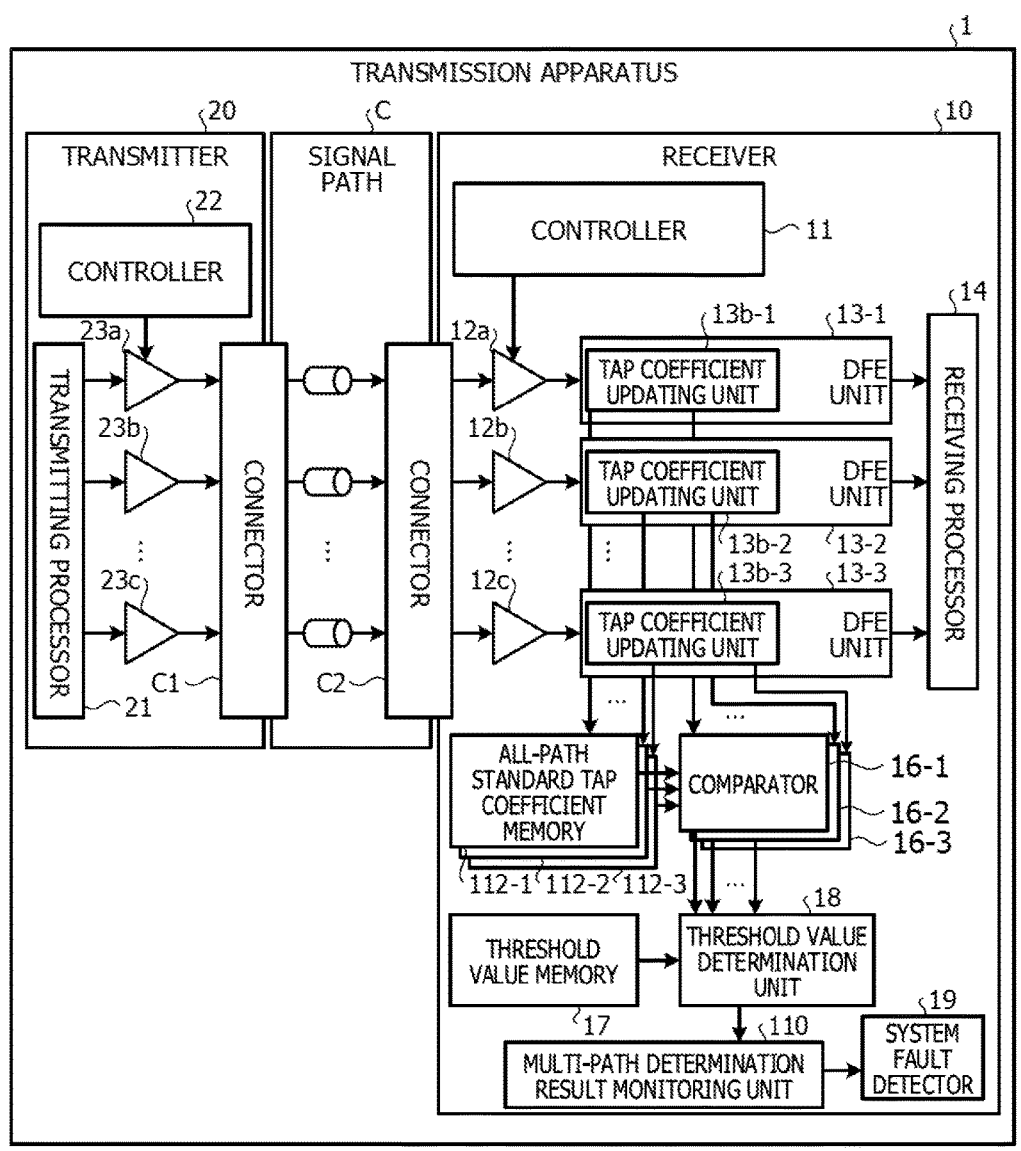
FIG. 20 illustrates a configuration of a transmission apparatus of a sixth modification.

A sixth modification is described below. FIG. 20 illustrates a configuration of a transmission apparatus 1 of the sixth modification. The transmission apparatus 1 of the sixth modification is identical in configuration to the transmission apparatus 1 of the first modification of FIG. 11 except that all-path standard tap coefficient memories 112-1, 112-2, and 112-3 are included instead of tap coefficient memories 15-1, 15-2, and 15-3. As illustrated in FIG. 20, configuration elements of the sixth modification identical to those of the first modification are designated with the same reference numerals and the detailed discussion thereof is omitted herein. Each of the all-path standard tap coefficient memories 112-1, 112-2, and 112-3 stores a tap coefficient (standard tap coefficient) that covers all paths in the transmission apparatus 1 as a determination target.

Figure 21:
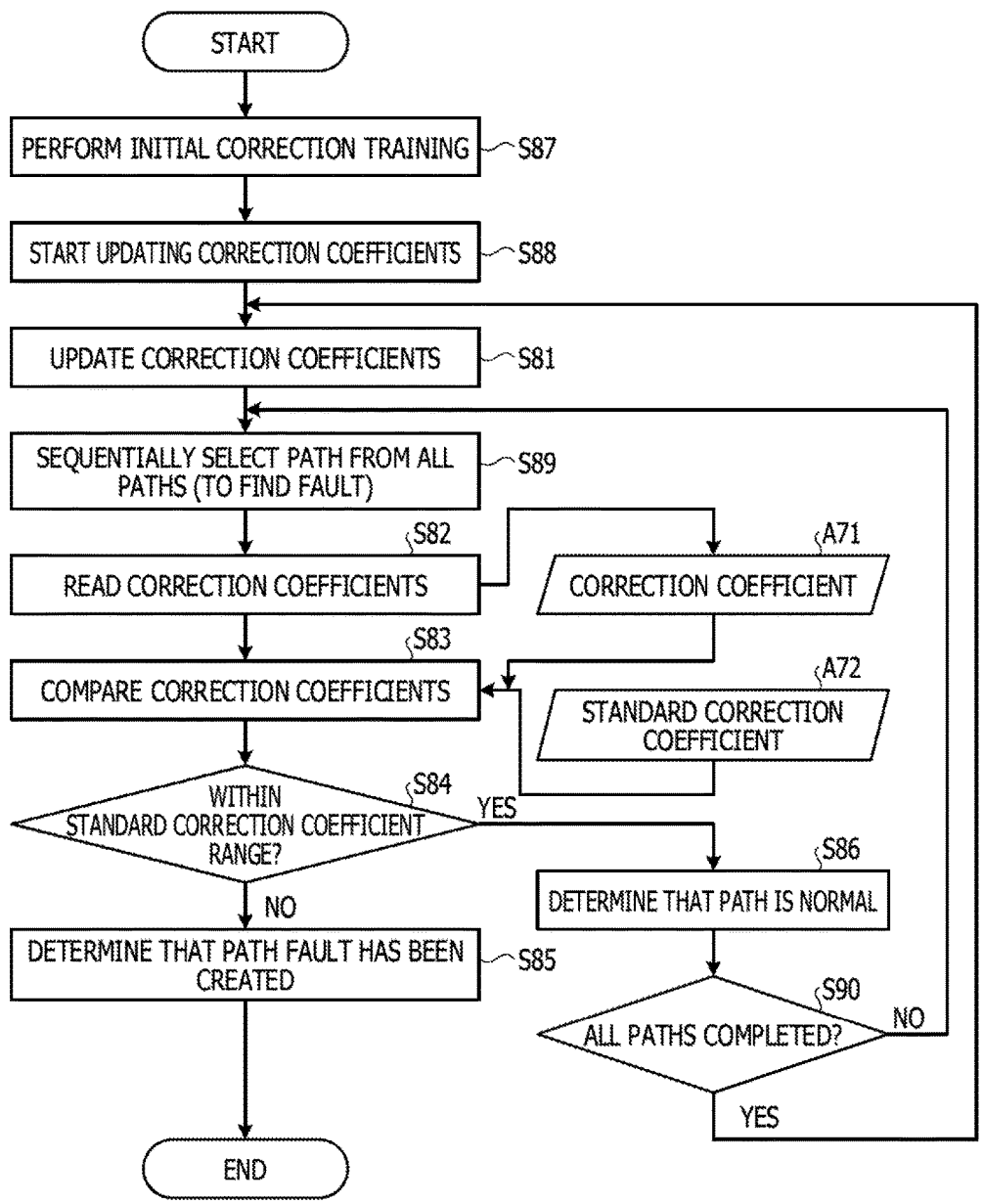
FIG. 21 is a flowchart illustrating a process of the transmission apparatus of the sixth modification.

FIG. 21 is a flowchart illustrating a process of the transmission apparatus 1 of the sixth modification. FIG. 21 illustrates multiple identical steps that have been discussed for the process of the third modification with reference to FIG. 16, and the identical steps have the same final reference numbers, and the detailed discussion thereof is omitted.

More specifically, operations in steps S82 through S88 of FIG. 21 correspond to operations in steps S42 through S48 of FIG. 16.

Referring to FIG. 21, using an adaptive equalizer continuously performing an equalization operation, the transmission apparatus 1 of the sixth modification references the tap coefficient at any timing, and determines the presence or absence of a mating fault in accordance with the value of the tap coefficient. In the determination, the transmission apparatus 1 of the sixth modification includes a single comparator instead of including comparators with one comparator on a per signal path basis, uses the single comparator in a time-division manner, and successively selects each of the multiple signal paths as a determination target one at a time. More specifically, in S81, the tap coefficient updating units 13b-1, 13b-2, and 13b-3 update the correction coefficients. In S89, the comparator 16 successively selects a signal path as the determination target from the signal paths until the determination of the presence or absence of the mating fault on all the signal paths is complete. In S90, the system fault detector 19 determines whether all the signal paths are normal. If all the signal paths are normal (yes branch from S90), processing proceeds to S81 to update the correction coefficient. If any signal path remains to be determined (no branch from S90), processing returns to S89 such that a remaining signal path is selected as a new determination target. The transmission apparatus 1 of the sixth modification may set the timing of extracting the correction coefficient for comparison, namely, the timing of fault detection, to be within a period permitted to detect a fault (a long period, such as once every hour or once a day). As a result, circuit scale and power consumption are thus reduced.

The configuration elements of the transmission apparatus 1 described above do not necessarily have to be physically organized as illustrated in the drawings. More specifically, specific forms in terms of segmentation and integration of each apparatus are not limited to those illustrated in the drawings. Whole or part of each apparatus may be functionally or physically segmented or integrated by any unit in response to a variety of workloads and use state. For example, the comparator 16 and the threshold value determination unit 18 or the threshold value determination unit 18 and the system fault detector 19 may be integrated into a unitary module. In such a case, the tap coefficient memory 15 and the threshold value memory 17 may also be integrated into a unitary module. The equalizer 13a that compensates for degradation attributed to the effect of reflection or attenuation or the tap coefficient updating unit 13b that controls each tap of a digital filter may be set to be external to the DFE unit 13. The memory storing the tap coefficient, the threshold value, the signal path to physical location correspondence information B1, the physical location to segmented area correspondence information B2, and the like may be set to be external to the transmission apparatus 1 as an outside device and may be interconnected to the transmission apparatus 1 via a cable or a network.

In the above discussion, the configuration and process of each configuration element are described on an embodiment basis or on a modification basis. The transmission apparatuses of the embodiment and the modifications may include a configuration element unique to another embodiment or modification. Any combination of the embodiment and the modifications may be possible, for example, the embodiment may be combined one or two of the modifications. For example, the multi-path monitoring function of the first modification (see FIG. 11) may be added to the early fault detection function of the fourth modification (see FIG. 17). The correction period D1 (see FIG. 16) of the third modification may be used to confirm whether the upper limit of the fifth modification has been reached (see FIG. 19). The transmission apparatus 1 may include all configurations described with reference to the embodiment and the first through fifth modifications.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission apparatus comprising:
a connector that couples a signal path to a receiver;
an equalizer that performs an equalization operation on received signals to be input to the receiver via the connector;
a controller that calculates a tap coefficient controlling an operation of the equalizer and sets the tap coefficient in the equalizer;
a comparator that compares the calculated tap coefficient with an initial tap coefficient at an initial state; and
a detector that detects a mating fault of the signal path in the connector by comparing the comparison result outputted from the comparator with an acceptability standard permissible value.

2. The transmission apparatus according to claim 1, wherein the detector monitors the tap coefficients of a plurality of signal paths, and identifies in response to monitoring results whether a single signal path or a plurality of signal paths suffer from the mating fault.

3. The transmission apparatus according to claim 2, wherein the detector compares each of the tap coefficients with an upper limit thereof, and determines that a fault that an equalizing capability of the equalizer is exceeded has been created when at least one of the tap coefficient sticks to the upper limit.

4. The transmission apparatus according to claim 1, wherein the detector associates each of the signal paths with a physical location of a connector pin of the connector and detects a faulty state in the physical location and a degree of concentration of faulty connector pins.

5. The transmission apparatus according to claim 1, wherein the detector monitors the tap coefficients with a predetermined period of time and detects, when the tap coefficient exceeds a permissible value of the equalizer, determines the mating fault has been created.

6. The transmission apparatus according to claim 1, wherein the detector detects an early fault in the equalizer by comparing the tap coefficient with a standard value.

* * * * *